US011269901B2

(12) United States Patent
Madan et al.

(10) Patent No.: US 11,269,901 B2
(45) Date of Patent: Mar. 8, 2022

(54) COGNITIVE TEST ADVISOR FACILITY FOR IDENTIFYING TEST REPAIR ACTIONS

(71) Applicant: INTERNATIONAL BUSINESS MACHINES CORPORATION, Armonk, NY (US)

(72) Inventors: Neeraj Madan, Little Elm, TX (US); Gersain Mesa, Poughkeepsie, NY (US); Kanayo George Okonji, Wappingers Falls, NY (US); Steven Holbrooks, Pittsboro, NC (US); Mark C. Booth, Shippensburg, PA (US); Rogelio Fernando Gutierrez Valdes, Tlaquepaque (MX); Chanchal Saha, Beacon, NY (US); Oscar Alejandro de la Torre, Japopan (MX); Christian Nugraha, Singapore (SG); Anthony George Gorey, Fishkill, NY (US); Teik Seng Poh, Singapore (SG); Richard Laviano, Research Triangle, NC (US); Robert Edge, Jr., Port Ewen, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 146 days.

(21) Appl. No.: 16/744,649

(22) Filed: Jan. 16, 2020

(65) Prior Publication Data
US 2021/0224265 A1 Jul. 22, 2021

(51) Int. Cl.
*G06F 16/2458* (2019.01)
*G06N 20/00* (2019.01)
*G06F 16/2457* (2019.01)

(52) U.S. Cl.
CPC .... *G06F 16/2462* (2019.01); *G06F 16/24578* (2019.01); *G06N 20/00* (2019.01)

(58) Field of Classification Search
None
See application file for complete search history.

(56) References Cited

U.S. PATENT DOCUMENTS 7,395,252 B2 7/2008 Anderson et al.
7,409,317 B2 8/2008 Cousin et al.
(Continued)

FOREIGN PATENT DOCUMENTS

CN 104376033 A 2/2015
CN 108363665 A 8/2018
(Continued)

OTHER PUBLICATIONS

Neumann et al., "Cognitive, Performance, and Systems Issues for Augmented Reality Applications in Manufacturing and Maintenance", IEEE Proceedings, Virtual Reality Annual International Symposium (1998) (8 pages).
(Continued)

*Primary Examiner* — Hau H Hoang
(74) *Attorney, Agent, or Firm* — Tihon Poltavets, Esq.; Kevin P. Radigan, Esq.; Heslin Rothenberg Farley & Mesiti P.C.

(57) ABSTRACT

A cognitive test advisor facility is provided to identify repair action recommendations. The facility receives a user input regarding a test failure, and generates an expanded search input by identifying additional, alternative words for the user input. A database(s) is searched for test failure records relevant to keywords of the expanded search input, and relevant test failure records are prioritized using a relationship strength score based, at least in part, on relationship of the test failure records to the expanded search input. The facility detects test failure records from the searching having a relationship strength score higher than a threshold value, and analyzes the detected test failure records to identify potential test repair actions. Based on the analyzing, the
(Continued)

facility generates a solution priority list including one or more suggested test repair actions for the test failure, and provides the solution priority list to the user.

17 Claims, 16 Drawing Sheets

(56) References Cited

U.S. PATENT DOCUMENTS

| | | | |
|---|---|---|---|
| 7,493,183 | B2 | 2/2009 | Bjornson et al. |
| 7,580,831 | B2 | 8/2009 | Haskell et al. |
| 7,596,571 | B2 | 9/2009 | Sifry |
| 7,711,571 | B2 | 5/2010 | Heiner et al. |
| 8,200,676 | B2 | 6/2012 | Frank |
| 8,610,604 | B2 | 12/2013 | Glass et al. |
| 8,819,652 | B2 | 8/2014 | Zingelewicz et al. |
| 8,914,252 | B2 | 12/2014 | Fujiwara et al. |
| 9,064,017 | B2 | 6/2015 | Bilic et al. |
| 9,122,743 | B2 | 9/2015 | Bolls et al. |
| 9,329,962 | B2 | 5/2016 | Salame |
| 9,995,655 | B2 | 6/2018 | Dagnino et al. |
| 10,121,268 | B2 | 11/2018 | Baumecker |
| 2003/0028353 | A1 | 2/2003 | Gventer |
| 2005/0021294 | A1 | 1/2005 | Trsar et al. |
| 2005/0065842 | A1 | 3/2005 | Summers |
| 2005/0187920 | A1 | 8/2005 | Tenembaum et al. |
| 2008/0270847 | A1 | 10/2008 | Connally et al. |
| 2010/0039433 | A1 | 2/2010 | McGreevy et al. |
| 2010/0083029 | A1* | 4/2010 | Erickson ............. G06F 11/0709 714/2 |
| 2013/0232094 | A1 | 9/2013 | Anderson et al. |
| 2013/0246430 | A1 | 9/2013 | Szucs et al. |
| 2014/0201227 | A1 | 7/2014 | Hamilton-Dick et al. |
| 2014/0229409 | A1 | 8/2014 | Kaushal et al. |
| 2015/0309906 | A1 | 10/2015 | Salame |
| 2015/0348294 | A1 | 12/2015 | Sridharan et al. |
| 2016/0026915 | A1 | 1/2016 | Delp |
| 2016/0078403 | A1 | 3/2016 | Sethi et al. |
| 2016/0116892 | A1 | 4/2016 | Cheng et al. |
| 2016/0239487 | A1* | 8/2016 | Potharaju .......... G06F 16/24578 |
| 2016/0300171 | A1 | 10/2016 | Boldrin et al. |
| 2016/0370798 | A1 | 12/2016 | Georgeson et al. |
| 2017/0024312 | A1 | 1/2017 | Salame |
| 2017/0148102 | A1 | 5/2017 | Franke et al. |
| 2017/0206127 | A1 | 7/2017 | Thompson et al. |
| 2017/0351226 | A1 | 12/2017 | Bliss et al. |
| 2018/0089615 | A1 | 3/2018 | Mattingly et al. |
| 2019/0146901 | A1 | 5/2019 | Hoover et al. |

FOREIGN PATENT DOCUMENTS

| | | |
|---|---|---|
| CN | 109542880 A | 3/2019 |
| WO | WO 02/39319 A1 | 5/2002 |
| WO | WO 03/015059 A1 | 2/2003 |
| WO | WO 2014/138838 A1 | 9/2014 |

OTHER PUBLICATIONS

Mel et al., "The NIST Definition of Cloud Computing," National Institute of Standards and Technology, Information Technology Laboratory, Special Publication 800-145, Sep. 2011 (7 pages).

Saha et al., "A Decision Support System for Real-Time Order Management in a Heterogeneous Production Environment", Expert Systems with Applications, vol. 50, Oct. 2015 (22 pages).

* cited by examiner

Dynamic Technical Dictionary Data Structure

| Technical Words | Alternate Words | Relationship Strength* |
|---|---|---|
| Node | cec | .75 |
| Node | frame | .92 |
| Node | drawers | .90 |
| Node | Book | .95 |

\* Relationship Strength = Combination Strength Score + Reinforcement Learning Score Where:
- Combination Strength Score is determined using NLP keywords search matching algorithm
- Reinforcement Learning Score is determined using Hierarchal Reinforcement Learning algorithm

FIG. 7

Expand search horizon for querying manufacturing test data from user inputs

| User inputs | Eror BE306015 in modul P1 C13 re-code failure | |
|---|---|---|
| Method | Example | How |
| Translate non-English word & error | Replace "Eror BE306015 in modul P1 C13 re-code failure" into "Error BE306015 in module P1 C13 re-code failure" | Auto-correct & translator for pattern recognition |
| Categorize key words for extensive search | Technical words: re-code, module, BE306015<br>English words: error, failure<br>Assembly/subassembly words: P1 C13 | Find minimal critical inputs to query data |

| Method | Extracted key words | Synonyms/Alternatives | How | Output (tag clouds) |
|---|---|---|---|---|
| Translate non-English word & error | BE306015, re-code, module | Code, symbol, Sub-assembly, drawer, book, cec, HMC consoles | Find meaning of technical words from 'dynamic technical dictionary' that has relationship strength score > X | Tag clouds<br>1. HMC_console, BE306015<br>2. Code, recode, re-code, symbol<br>3. module, book, drawers, cec |
| English words | error, failure | Mistake, fault, typo, failing, not working, crush | Find synonyms from dictionary | 4. error, mistake, fault,<br>5. failing, not working, crush |
| Assembly/subassembly related words | P1 C13 | P1 C14, P1C12 | Find parts history for sub-assemblies or alternative parts | 6. P1 C13, P 1 C14, P1C 12 |

| Final outputs | Extracted data from databases using additional contents for the tag clouds (right most column) |
|---|---|

FIG. 8

Steps for Dynamic Dictionary Content Management: ⎯920

| Error Code | Error Message |
|---|---|
| ⊟ BE306015 | Found 1 errors on the problem log on vba02h. Please use HMC Console to solve and CLOSE them.<br>Found 1 errors on the problem log on vba03m. Please use HMC Console to solve and CLOSE them.<br>Found 1 errors on the problem log on vba04h. Please use HMC Console to solve and CLOSE them.<br>Found 1 errors on the problem log on vba04h. Please use HMC Console to solve and CLOSE them.<br>Found 1 errors on the problem log on vba05h. Please use HMC Console to solve and CLOSE them.<br>Found 1 errors on the problem log on vba06h. Please use HMC Console to solve and CLOSE them.<br>Found 1 errors on the problem log on vba10h. Please use HMC Console to solve and CLOSE them.<br>Found 1 errors on the problem log on vba10h. Please use HMC Console to solve and CLOSE them.<br>Found 1 errors on the problem log on vba06h. Please use HMC Console to solve and CLOSE them.<br>Found 1 errors on the problem log on vba10h. Please use HMC Console to solve and CLOSE them. |

922 —

| Error Code |
|---|
| ⊟ BE306015 |
| ⊟ BE304442 |
| ⊟ BE322101 |
| ⊟ BE19B2F2 |
| ⊟ BE340012 |

Dynamic Technical Dictionary Data Structure

| Error Code | Reference Code | Relationship_Strength |
|---|---|---|
| ⊟ BE306015 | vba02h | 1.00 |
| ⊟ BE304442 | vba02h | 0.75 |
| ⊟ BE322101 | vba02h | 0.25 |
| ⊟ BE19B2F2 | vba02h | 0.25 |
| ⊟ BE340012 | vba02h | 0.25 |

⎯924

Solution Priority List ⎯926

| MORE DETAILS | FIX | SUCCESS RATE |
|---|---|---|
| REPLACE AS PER ADVISE C39 (00VK297 DIMM CDIMM 32G8 MEM P1 C39) | | 61.21 |
| REPLACE P1-C22 (00VK307 DIMM CDIMM 64G8 MEM P1 C22) | | 61.21 |
| REGRESS TEST (00VK297 DIMM CDIMM 32G8 MEM P1 C44) | | 48.98 |
| RETRY (00VK297 DIMM CDIMM 32G8 MEM) | | 36.73 |
| RETRY (00VK307 DIMM CDIMM 64G8 2U) | | 34.68 |
| RESEATED C39 DIMM AND RETRY | | 30.61 |

FIG. 9B

- Example: for a test failure, provides a repair recommendation (i) as "Retry 00V9307 DIMM CD/MM 32 GB MEM"
  - User's (k) feedback ($r_i$) for that repair recommendation at various time:

| Time (t) | User (K) | Feedback | Reward/Penalty ($r_i$) |
|---|---|---|---|
| Now (t = 1) | Test Lead | Good | 0.5 |
| 1 month ago (t = 2) | Test Lead | Good | 0.5 |
| 2 month ago (t = 3) | Test Engineer | Alright | 0 |
| Now (t = 1) | Test Tech | Bad | -0.5 |
| Now (t = 1) | Test Engineer | Excellent | 1 |

FIG. 10C

Weight Matrix

| Recommendation (i) | Person (K) | Weight ($w_{ik}$) |
|---|---|---|
| Retry 00V9307 DIMM CD/MM 32 GB MEM | Test Engineer | 1 |
| | Test Lead | 0.80 |
| | Test Tech | .70 |
| | Others | 0.5 |
| Retry 00V9307 DIMM CD/MM 64 GB MEM | Test Engineer | 1 |
| | Test Lead | 0.80 |
| | Test Tech | .70 |
| | Others | 0.5 |

FIG. 10D

Reward/Penalty ($r_i$) Matrix

| Feedback | Reward/Penalty ($r_i$) |
|---|---|
| Excellent | 1 |
| Good | 0.5 |
| Alright | 0 |
| Bad | -0.5 |
| Too bad | -1 |

FIG. 10E

Hierarchical Reinforcement Learning Score, $Z_i$ = Retry 00V9307 DIMM CD/MM 32 GB MEM

| t | γ | r (i) | w (ik) | Z(i,t) |
|---|---|---|---|---|
| 1 | 0.8 | 0.5 | 0.8 | 0.320 |
| 2 | 0.8 | 0.5 | 0.8 | 0.256 |
| 3 | 0.8 | 0 | 1 | 0.000 |
| 4 | 0.8 | -0.5 | 0.7 | -0.143 |
| 5 | 0.8 | 1 | 1 | 0.328 |
| | | | Z(i) | 0.760 |

FIG. 10F

COGNITIVE TEST ADVISOR FACILITY FOR IDENTIFYING TEST REPAIR ACTIONS

BACKGROUND

The present invention relates generally to systems for identifying and resolving manufacturing test failures, and more specifically, to cognitive manufacturing test systems for identifying and prioritizing potential test repair actions.

Manufacturing systems often employ one or more manufacturing tests as part of a test failure plan. The test plan often requires each test to be applied separately in series. As such, in cases where a test of the test plan fails, the entire test plan may be delayed until the test failure is resolved.

SUMMARY

Certain shortcomings of the prior art are overcome and additional advantages are provided through the provision, in one or more aspects, of a computer-implemented method which includes receiving, by a system including one or more processors, a user input regarding a test failure occurring during manufacturing testing, and generating, by the system, from the user input, an expanded search input, the generating including identifying additional, alternative words for one or more words of the user input to obtain an expanded number of keywords for searching. The method also includes searching, by the system, at least one database for test failure records relevant to the keywords of the expanded search input, and prioritizing relevant test failure records via a relationship strength score based, at least in part, on relationship of the test failure records to one or more keywords of the expanded search input. Further, the method includes: detecting, by the system, test failure records from the searching having a relationship strength score higher than a threshold value; analyzing, by the system, the detected test failure records to identify potential test repair actions; generating, by the system, based on the analyzing, a solution priority list including one or more suggested test repair actions for the test failure; and providing, by the system, the solution priority list to the user.

Computer systems and computer program products relating to one or more aspects are also described and claimed herein. Further, services relating to one or more aspects are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 7 depicts one embodiment of a dynamic technical dictionary data structure for use by a cognitive test advisor facility/system, and illustrating technical word relationship strength scores determined, at least in part, via a reinforcement learning score, in accordance with one or more aspects of the present invention;

FIG. 8 depicts an operational example of the cognitive test advisor facility processing of FIG. 6, where an expanded search input, such as expanded search input tag clouds, is (or are) generated for use in searching one or more test failure databases, in accordance with one or more aspects of the present invention;

FIG. 9B depicts an example process for deriving recommendations for a test failure using a dynamic technical dictionary data structure and reinforcement learning, in accordance with one or more aspects of the present invention;

FIG. 10C depicts one embodiment of a feedback data structure which includes user feedback on a repair action recommendation provided and tried at different times, for use in hierarchical reinforcement learning processing, in accordance with one or more aspects of the present invention;

FIG. 10D depicts one embodiment of a weight ($w_{ik}$) matrix for use in hierarchical reinforcement learning processing, in accordance with one or more aspects of the present invention;

FIG. 10E depicts one embodiment of a reward/penalty ($r_i$) matrix for use in hierarchical reinforcement learning processing, in accordance with one or more aspects of the present invention;

FIG. 10F depicts one embodiment of a learning score data structure depicting hierarchical reinforcement learning scores for the users' feedback on the repair action recommendation provided, and tried, at various times, in accordance with one or more aspects of the present invention;

DETAILED DESCRIPTION

Aspects of the present invention and certain features, advantages and details thereof, are explained more fully below with reference to the non-limiting example(s) illustrated in the accompanying drawings. Descriptions of well-known materials, systems, devices, processing techniques, etc., are omitted so as to not unnecessarily obscure the invention in detail. It should be understood, however, that the detailed description and this specific example(s), while indicating aspects of the invention, are given by way of illustration only, and not by way of limitation. Various substitutions, modifications, additions, and/or other arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application of a computer-implemented test advisor facility configured to identify and provide one or more suggested test repair actions based on a test failure occurring during manufacturing testing.

Note also that illustrative embodiments are described below using specific code, designs, architectures, protocols, layouts, schematics, or tools, only as examples, and not by way of limitation. Furthermore, the illustrative embodiments are described in certain instances using particular software tools, and data processing environments only as example for clarity of description. The illustrative embodiments can be used in conjunction with other comparable or similarly-purposed structures, systems, applications, or architectures. One or more aspects of an illustrative embodiment can be implemented in hardware, software, or a combination thereof.

Any advantages listed herein are only examples, and are not intended to be limiting to the illustrative embodiments. Additional or different advantages can be realized by specific illustrative embodiments. Furthermore, a particular illustrative embodiment can have some, all, or none of the advantages listed herein.

Figure 11:
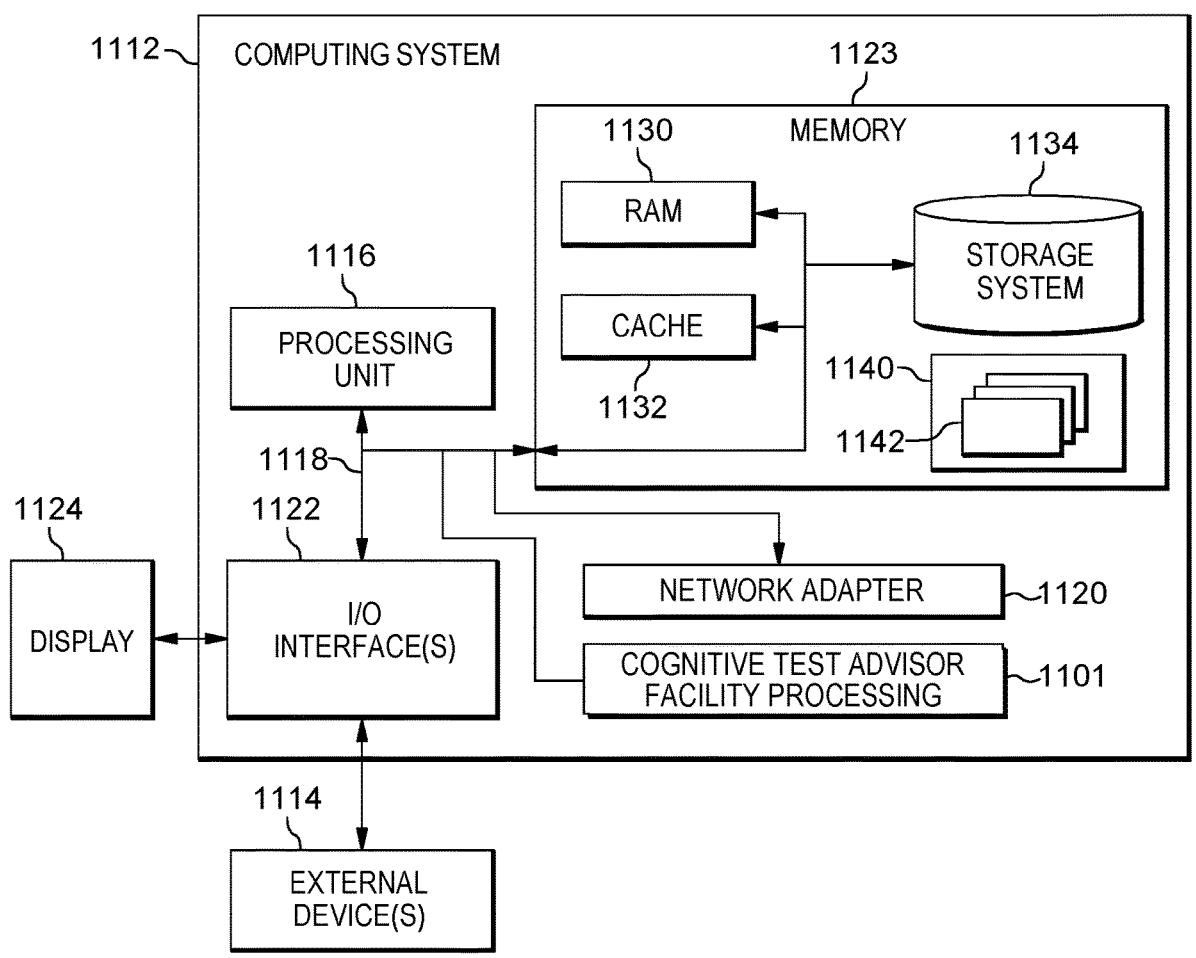
FIG. 11 depicts one embodiment of a computing system which can implement or facilitate implementing cognitive test advisor facility processing, in accordance with one or more aspects of the present invention.

As understood by one skilled in the art, program code, as referred to in this application, can include both software and hardware. For instance, program code in certain embodiments of the present invention can include fixed function hardware, while other embodiments can utilize a software-based implementation of the functionality described. Certain embodiments combine both types of program code. One example of program code, also referred to as one or more programs, is depicted in FIG. 11 as program/utility 1140, having a set (at least one) of program modules 1142, which can be stored in memory 1123.

As noted, manufacturing systems often employ one or more tests as part of a test plan, which is to be performed for potentially identifying one or more manufacturing test-related failures. Each test of the plan is applied in series. The process is repeated until all tests of the test plan are completed. However, in cases where a test fails, the test plan is often delayed until the test failure is resolved. Delaying of test plan execution can cause issues, such as downstream bottlenecks in the manufacturing process.

Aspects of one or more embodiments of the present invention address these shortcomings by providing a cognitive test advisor facility, tool or system that can analyze structured and unstructured data to more quickly determine possible test failure repair actions. In one embodiment, the facility performs data analytics on previously run tests, planned tests, failure information, and user feedback data to determine one or more best-possible repair actions to take, based on a particular test failure.

Throughout this description, the terms test advisor facility, tool and system are used interchangeably to refer to certain aspects of the present invention that perform various operations, functions, and the like. As the terms are used herein, the test advisor facility, tool and system can be an implementation of the functions or aspects of the illustrative embodiments in the form of an apparatus, a procedure, or a computer program product. In the case of a procedure, the procedure is implemented by one or more devices, apparatuses, computers, data processing systems, or the like. In the case of a computer program product, the logic represented by computer code or instructions embodied in or on the computer program product is executed by one or more hardware devices in order to implement the functionality to perform the operations associated with the specific facility. Thus, the facility described herein can be implemented as specialized hardware, software executing on general purpose hardware, software instructions stored on a medium such that the instructions are readily executable by specialized or general purpose hardware, a procedure or method for executing the functions, etc., or a combination of any of the above.

One or more embodiments of the present invention provide a test advisor facility or cognitive machine learning tool that resolves manufacturing systems test failures by profiling test failures and recommending a next best action(s) via one or more machine learning processes. In some embodiments of the present invention, this includes the ability to identify and propose best possible test repair actions based on historical data and cognitive learning capability relating to a particular detected quality problem. Cognitive machine learning can be used to identify root causes or symptoms over time for each test failure. In this manner, similar test failures can be automatically assessed and resolved based on previous test results and on feedback stored in a data repository. In some embodiments of the present invention, several variables can be accounted for in the allocation of a repair part when resolving a particular problem. In some embodiments of the present invention, the variables include part availability, the cycle time for the repair, quality hold, and a client requested ship date. Each of the variables can be weighed within a multi-criteria decision making algorithm that maximizes and prioritizes which repair actions should be completed to optimize the overall manufacturing process. In some embodiments of the present invention, the test plan is automatically re-sequenced to bypass test steps that are impacted by the test failure. For example, in some embodiments, rather than simply stopping the test plan pending a repair action, other test steps of the test plan, that are not impacted by the defect part are executed in parallel while a repair action part is being identified and obtained.

Guidance can be provided through machine learning to dynamically adjust the test plan based on previous experience. In some embodiments of the present invention, corrective action is performed automatically without the need of interaction by a test operator. For example, a new microcode update or an automatic re-run of test cases (or sequencing) can be generated using machine learning and experience. In some embodiments of the present invention, structured and unstructured test result data and defect records are utilized to establish relationships or screens between test steps and root causes, in which the relationships indicate the test steps that are likely to fail in the presence of a particular root cause. The established relationship knowledgebase can then be expanded to take into account multiple root causes. In some embodiments of the present invention, the relationship knowledge can be modified based on current test results or on new information via one or more cognitive engines for machine learning.

In addition, it is recognized herein that test processes generate an enormous amount of data that can be stored in multiple locations and multiple formats. In one or more embodiments, the cognitive test advisor facility disclosed advantageously reduces the time required to isolate and repair a failing system or machine. Less time spent debugging and analyzing a failure advantageously allows, for instance, additional time to be spent repairing the system or machine. Further, embodiments of the cognitive test advisor facility disclosed herein enhance test processing by reducing test cycle time and improving product quality.

Figure 1:
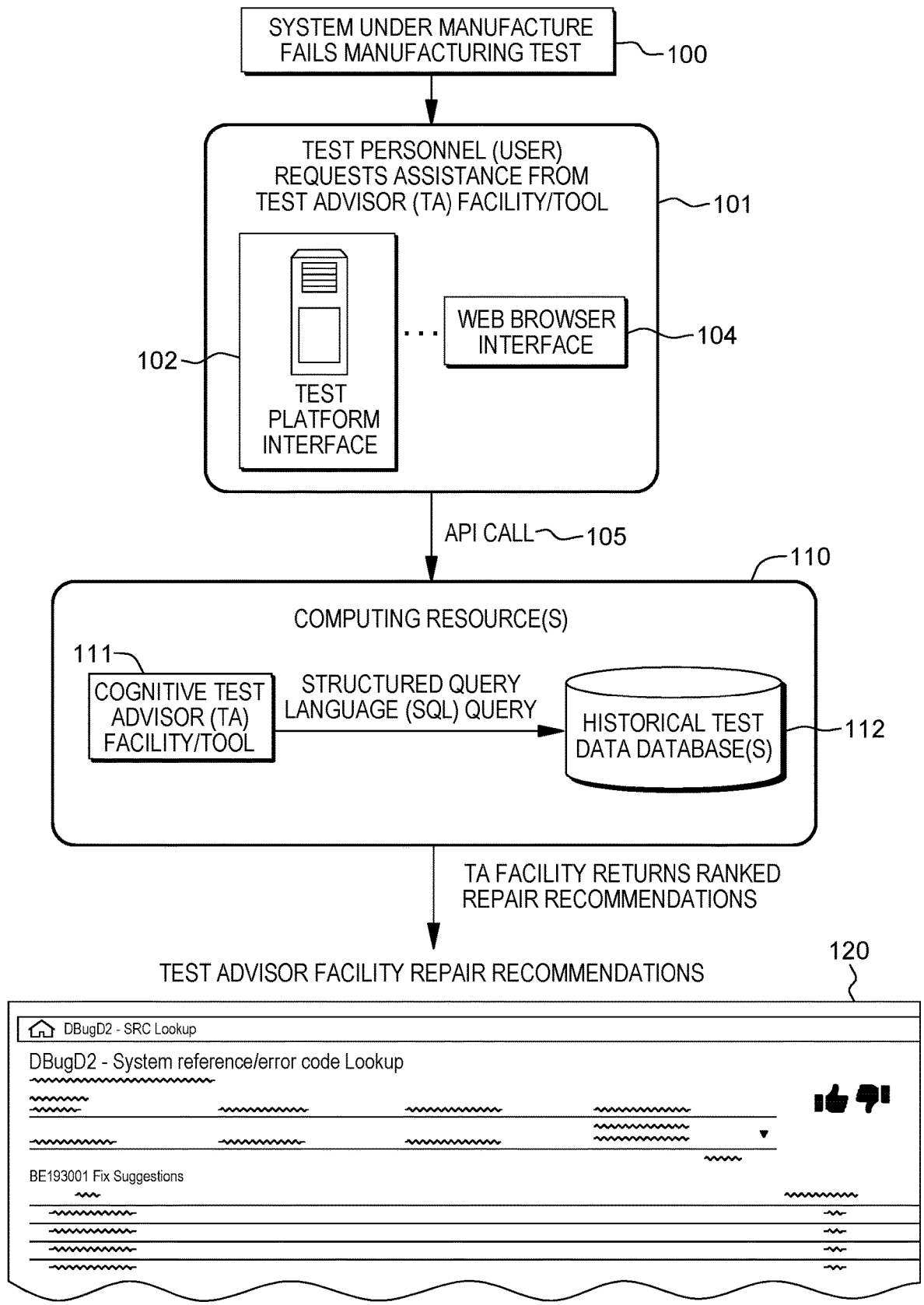
FIG. 1 depicts one embodiment of a process for identifying, by a cognitive test advisor facility/system, one or more potential test repair actions for a test failure, in accordance with one or more aspects of the present invention.

FIG. 1 depicts one embodiment of a test failure processing flow using a cognitive test advisor facility/tool, where initially, a machine under manufacture, such as a computing system, server, device, etc., fails a manufacturing test 100. Based on the test failure, test personnel request assistance 101 from the cognitive test advisor facility through, for instance, a test platform interface 102, a web browser interface 104, etc. In one embodiment, an application program interface (API) call 105 is made to cognitive test advisor facility 111 implemented, in one or more embodiments, as program code executing on one or more computing resources 110. In one embodiment, a common API call can be used across multiple test platforms, if desired. Cognitive test advisor facility 111 processes a user input or input request with reference to one or more databases 112 of historical test data for the manufacturing process. One or more databases 112 of historical test data can be associated with computing resource(s) 110, as shown, or accessible by computing resource(s) 110 across a network. As explained, cognitive test advisor facility 111 returns, in one or more embodiments, suggested test repair actions, which can be ranked repair recommendations that are presented, such as via a graphical user interface (GUI) 120, on a display. One or more of the suggested repair actions are then used by the user, or by the test advisor facility itself directly (depending on the recommendation), to make a repair or an adjustment, such as to the manufacturing process, to address the test failure.

In one or more embodiments, the cognitive test advisor facility disclosed herein is configured to generate test plans based on test failure root causes and/or symptoms. In one or more embodiments, the facility analyzes structured and unstructured data using machine learning processes to determine the best possible test failure repair action recommendation, based on user input. Further, in one or more embodiments, disclosed herein are solutions to several challenges when querying unstructured data for failure analysis and prioritizing recommendations for repair actions. In particular, one challenge is that unstructured data is being queried from databases based on a user-provided input. As an enhancement, the user input is analyzed and expanded herein, for instance, for non-exact-matched words, spelling errors, technical word data, non-technical word data (e.g., English data), part-related data, etc. Further, another challenge is that a graphical user interface of recommended repair actions for an incident can show multiple recommendations, even though the English meaning of two or more different recommendations in the list may be the same, which can be due to the machine learning processes not understanding the true meaning of the recommendations. Another challenge for the cognitive test advisor facility is to determine relevant and meaningful weights for each queried data record with respect to the user input and/or provided feedback on success or failure of prior repair action recommendations.

Addressing these challenges, disclosed herein is a cognitive test advisor facility, tool or system which includes, in part, processing to create expanded search queries of manufacturing test data based on user input; to propose recommendations for repair actions that are meaningful, and different from one another; and to provide expanded search input by finding content for identified tag clouds using multiple word/data dictionaries.

In one or more embodiments, the cognitive test advisor disclosed herein is a computer-based facility, tool or system. The computer facility can execute on and/or include one or more processors, for instance, central processing units (CPUs). The processor(s) can include functional components used in the execution of program code, such as functional components to fetch program code from locations such as cache or main memory, decode program code, and execute program code, access memory for instruction execution, and write results of the executed instructions or code. A processor(s) can also include a register(s) to be used by one or more of the functional components. In one or more embodiments, the computing resource(s) can include memory, input/output, a network interface, and storage, which can include and/or access one or more databases, such as discussed herein. The components of the computing environment can be coupled to each other via one or more buses and/or other connections. Bus connections can be one or more of any of several types of bus structures, including a memory bus or a memory controller, a peripheral bus, an accelerated graphics port, and a processor or local bus, using any of a variety of bus architectures. By way of example, and not limitation, such architectures can include the Industry Standard Architecture (ISA), the Micro-Channel Architecture (MCA), the Enhanced ISA (EISA), the Video Electronic Standard Association (VESA) local bus, and the Peripheral Component Interconnect (PCI). Example computing environments or computer systems which can implement one or more aspects disclosed herein are described further below with reference to FIGS. 2 & 11-13.

Figure 2:
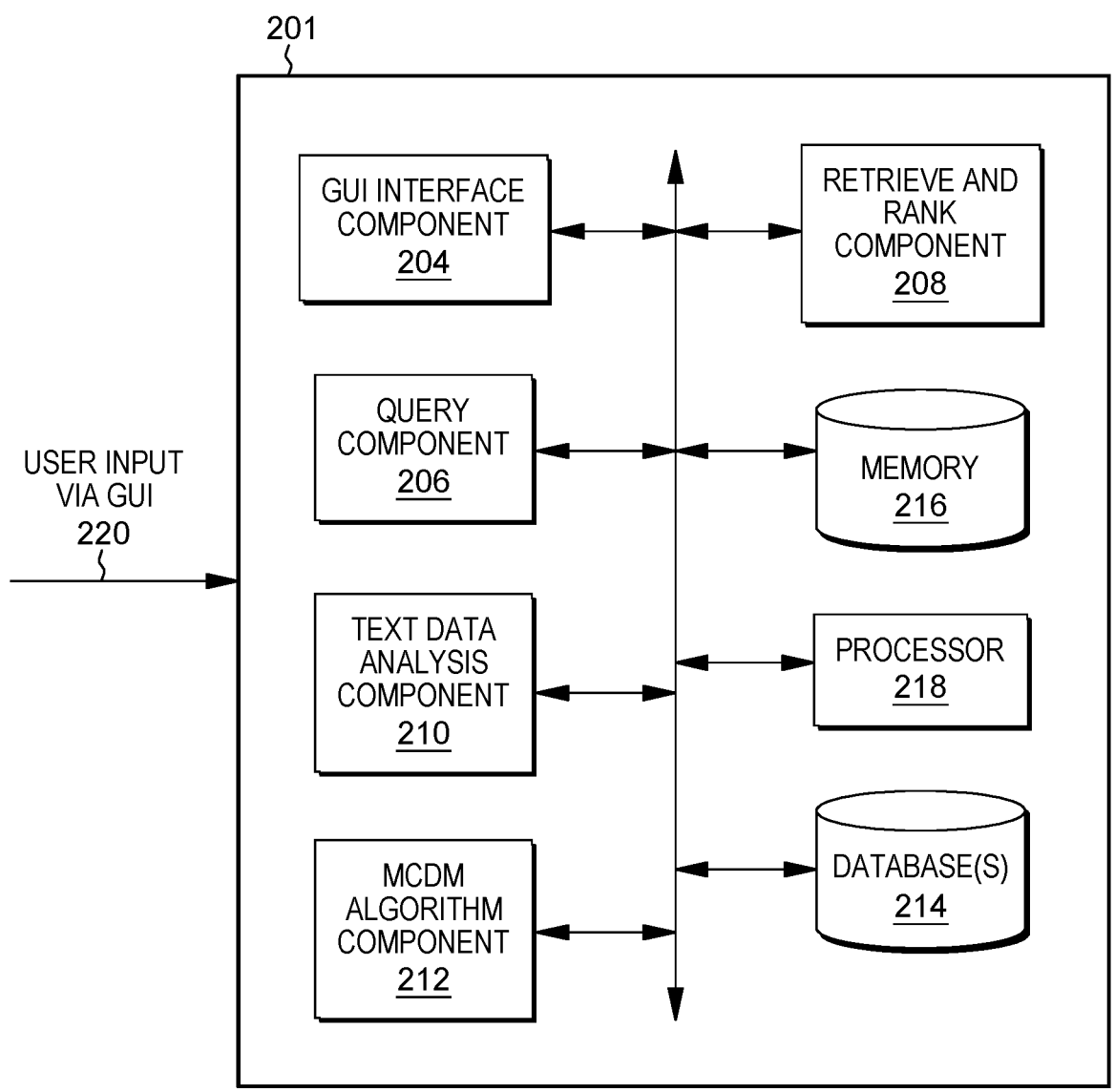
FIG. 2 depicts one embodiment of a cognitive test advisor facility/system, in accordance with one or more aspects of the present invention.

FIG. 2 depicts an example computer system 200 implementing one or more aspects of the present invention, in accordance with one or more embodiments. In one implementation, system 200 is a machine learning system that can be utilized to solve a variety of technical issues (e.g., learning previously unknown functional relationships) in connection with technologies such as, but not limited to, machine learning technologies, data analytics technologies, data classification technologies, data clustering technologies, recommendation system technologies, signal processing technologies, manufacturing defect and analysis technologies, and/or other digital technologies. System 200 employs hardware and/or software to solve problems that are highly technical in nature, that are not abstract and that cannot be realistically performed as a set of mental steps.

In certain embodiments of the present invention, some or all of the processes performed by system 200 are performed by one or more specialized computers (e.g., one or more specialized processing units, a specialized computer with a text data analysis component, etc.) for carrying out defined tasks related to machine learning. In some embodiments of the present invention, system 200 and/or components of the system can be employed to solve problems that arise through advancements in technologies such as mentioned herein.

In the example shown in FIG. 2, system 200 includes a test advisor facility or tool advisor component 201 that includes a GUI interface component 204, a query component 206, a retrieve and rank component 208, a text data analysis component 210, a multi-criteria decision making (MCDM) algorithm component 212, and one or more database(s) 214. In some embodiments of the invention, tool advisor component 201 constitutes a machine-executable component(s) embodied within a machine(s) (e.g., embodied in one or more computer readable mediums (or media) associated with one or more machines). Such component(s), when executed by the one or more machines, (e.g., computer(s), computing device(s), virtual machine(s), etc.) cause the machine(s) to perform the operations described. In some embodiments of the invention, tool advisor component 201 includes a memory 216 that stores computer executable components and instructions. Furthermore, tool advisor component 201 in some embodiments of the invention includes a processor 218 to facilitate execution of the instructions (e.g., computer executable components and corresponding instructions) by the tool advisor component 201. As shown, GUI interface component 204, query component 206, retrieve and rank component 208, text data analysis component 210, multi-criteria decision making (MCDM) algorithm component 212, database(s) 214, memory 216, and/or processor 218 are operatively coupled to one another in one or more embodiments of the invention.

In general, in one or more embodiments, tool advisor component 201 is a cognitive-based tool that is capable of diagnosing a root cause and/or symptom(s) of manufacturing test failures and then recommending one or more corrective course of actions based on structured and unstructured data that is associated with the manufacturing test failure. In some embodiments of the present invention, tool advisor component 201 determines the best possible test failure repair action(s) for a detected manufacturing test failure by, for example, analyzing data on previously run manufacturing systems tests, planned tests, failure information, and/or user feedback data on prior recommended repair actions. Tool advisor component 201 can provide, in one embodiment, a heat map that indicates which steps are more likely to cause a failure or be related to a particular symptom. In the context of a test failure, tool advisor component 201, in some embodiments, generates suggested possible repair actions in response to a user interaction with a heat map presented on a GUI. For example, in some embodiments of the present invention possible repair actions are provided when a user hovers over the heat map with a mouse cursor or contacts a touch screen of the computer, based on which the suggested action(s) can then be provided with supporting keywords. In some embodiments of the present invention, the GUI provides prioritized recommendations (based on the user input) for repair actions, for instance, repair cycle time for each recommendation. The GUI can also attach test logs to support a recommendation and to assist test technicians.

In order to resolve a test failure, a root cause and/or one or more corrective actions can be ascertained. In general, to analyze and resolve test failures, tool advisor component 201, in certain embodiments of the present invention, identifies critical attributes that are characteristic of a test failure and repair actions that are associated with the test failure via a machine learning service, such as for example, through the use of IBM Watson®. IBM and Watson are registered trademarks of International Business Machines Corporation, Armonk, N.Y. Other names used herein may be registered trademarks, trademarks, or product names of International Business Machines Corporation, or other companies.

In one embodiment, a GUI can be generated that allows a test technician to find test failures during a test process, in which the user is able to provide a set of attributes and a user comment to the system via the GUI (i.e., a user input). In some embodiments of the present invention, the attributes can include a combination of any of brand, machine type, machine model, commodity, modifier, defect code, operation number, operation step, and user comment fields. Tool advisor component 201 in certain embodiments is configured to utilize machine learning APIs (e.g., IBM Watson APIs, such as the Retrieve and Rank™ API, and Alchemy® API, that are provided by IBM), and optionally, or more multi-criteria decision-making (MCDM) algorithm(s) to identify one or more best possible solutions, as discussed further below.

Figure 4:
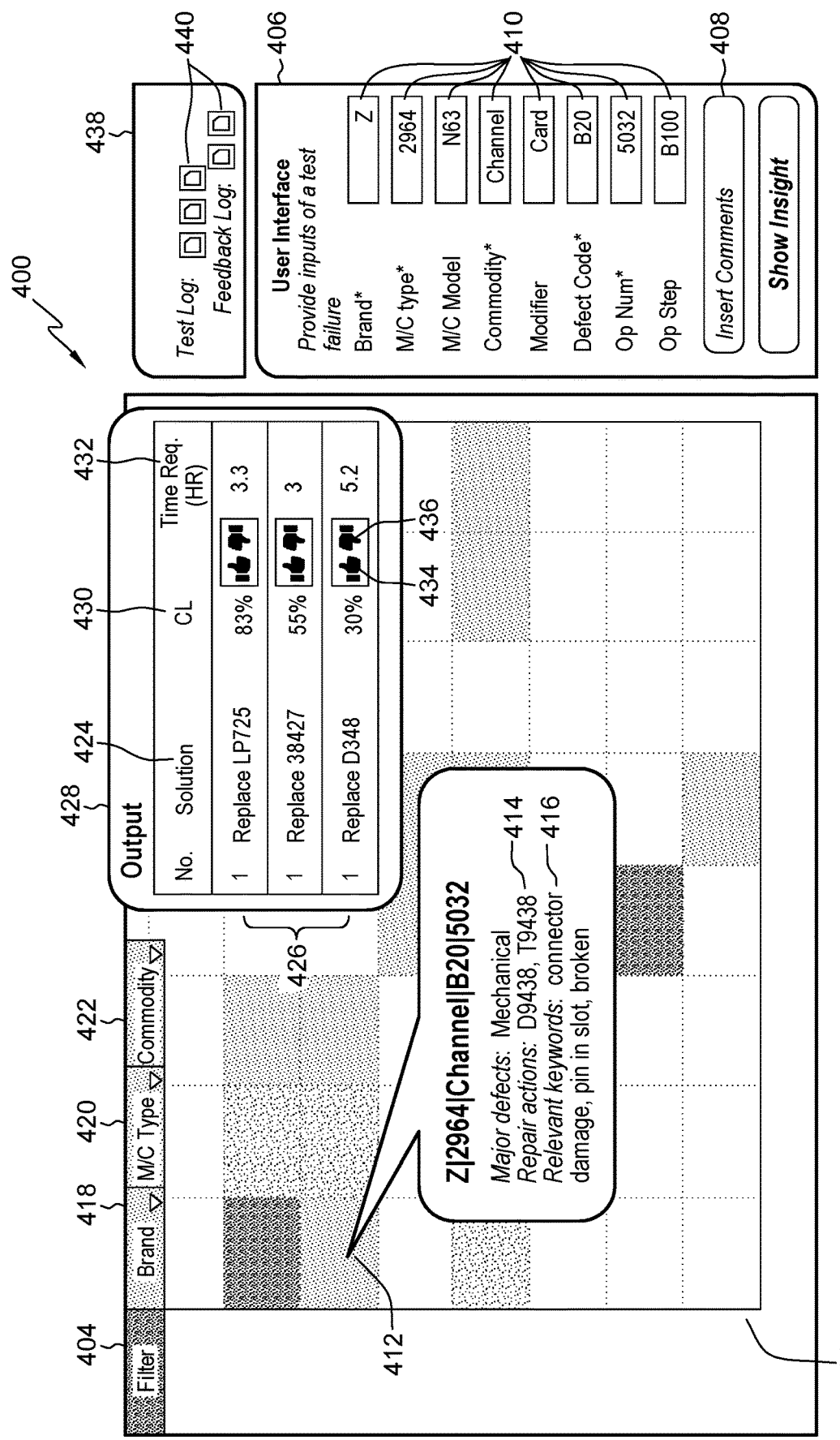
FIG. 4 depicts one embodiment of a graphical user interface (GUI) depicting an exemplary solution priority list of suggested test repair actions provided by a cognitive test advisor facility/system, in accordance with one or more aspects of the present invention.

GUI interface component 204 of tool advisor component 201 can be configured to generate a heat map pertaining to manufacturing process test failures, in which the heat map is based at least in part on historical test failures and prior repair actions. The heat map can be presented to a user via a GUI that is generated by GUI interface component 204. After the heat map is generated, tool advisor component 201 could receive a user input 220 via the GUI regarding a test failure of a manufacturing process. In some embodiments of the present invention, the GUI generated by GUI interface component 204 has multiple windows and/or views. FIG. 4 depicts an example GUI 400 in accordance with one or more embodiments of the present invention.

As shown in FIG. 4, in some embodiments of the present invention, GUI 400 includes a heat map 402 that is presented in the GUI 400 via a first window and/or view 404. Heat map 402 includes a grid including a plurality of color-coded or shaded cells. In some embodiments of the present invention, each color-coded cell of the plurality of color-coded cells is associated with a different respective operation number and defect code pair. In some embodiments of the present invention, GUI 400 includes a second window and/or view 406 that is configured to receive an input from a user (e.g., GUI input 220 (FIG. 2)). The input can include various attributes pertaining to a detected test failure of a manufacturing process that are entered by the user via various fields 408, 410. In one or more embodiments of the present invention, the GUI's second window and/or view 406 includes a user comment field 408 and at least one or more of the following fields 410: a brand, a machine type, a machine model, a commodity, a modifier, a defect code, an operation number, an operation step. The user input includes structured and unstructured data, in which the structured data includes attributes obtained from the various attribute fields 410, and the unstructured data includes text obtained from user comment field 408. In one or more embodiments of the present invention, heat map 402 provides a representation that includes, for each operation number defect code pair, frequency of failure occurrence 412, repair actions 414, and relevant keywords 416 that are proposed for a brand 418, machine type 420, and commodity 422. In some embodiments of the present invention, the frequency of failure occurrence 412 is represented by a color that is indicative of the relative frequency of occurrence of that particular operation number and defect code pair. In some embodiments of the present invention, the frequency of failure occurrence 412 is additionally or alternatively presented via text.

In one or more embodiments of the present invention, GUI 400 (e.g., interface component 204 (FIG. 2)) provides a test solution priority list 424 that includes one or more suggested test repair actions 426 as identified by the system. In some embodiments of the present invention, the one or more suggested test repair actions 426 are presented in a window and/or view 428 that is separate and/or distinct from heat map 402. In some embodiments of the present invention, priority list 424 further includes, for each of the one or more suggested test repair actions 426, a confidence level 430 and a time required to implement a respective proposed solution 432.

In some embodiments of the present invention, a user may provide feedback via the GUI 400 regarding the proposed test repair actions that are presented to the user. In some embodiments of the present invention, the feedback is provided via the clicking or selecting of a thumbs up 434 or a thumbs down symbol 436. In some embodiments of the present invention, the feedback is used to gather information from the user regarding whether a repair action that was displayed in the priority list was successful or unsuccessful. For example, a thumbs up 434 can be clicked or selected by the user upon identifying that a repair action of the priority list was successful, and a thumbs down 436 can be clicked or selected by the user upon identifying that a repair action of the priority list was unsuccessful. The feedback can be incorporated into machine learning (e.g., deep machine learning supervised or unsupervised algorithms) to improve future recommendation results. In some embodiments of the present invention, GUI 400 further includes a test log window 438. In some embodiments of the present invention, test log window 438 is a separate and/or distinct view and/or window from the heat map 402. In one or more embodiments of the present invention, test log window 438 includes one or more interactive icons 440 for selecting a particular database for search (e.g., database(s) 214 (FIG. 2)). In one embodiment of the present invention, the one or more interactive icons 440 include one or more test log selection icons and/or one or more feedback log selection icons. In some embodiments of the present invention, the GUI 400 provides the user with supporting documents for one or more repair actions that are displayed in the proposed priority list such as, for example, rework instruction(s), reference material(s) or other suitable supporting information.

Referring to FIG. 2, query component 206 is configured to query one or more databases 214 based on the structured and unstructured data that is submitted by the user via the GUI. In some embodiments of the present invention, query component 206 is configured to query one or more databases 214 to identify test failure and repair action incidents based on input 220 submitted by the user, such as one or more keywords that are extracted from text of the input 220. In some embodiments of the present invention, the database(s) 214 queried by query component 206 include a test log database and/or a defect database. In one or more embodiments, the one or more databases 214 additionally or alternatively include a feedback storage database that includes user provided feedback data.

Retrieve and rank component 208 is configured to search for the most relevant test failure records from the queried data and to prioritize the test failure records based on their proximity to the user input 220. In some embodiments of the present invention, retrieve and rank component 208 is configured to utilize a retrieve and rank API type service to perform the searching, such as for example the Retrieve and Rank™ service provided by IBM®. It should be understood that other suitable methods for searching and prioritizing relevant test failure records can be utilized, as known to those of ordinary skill in the art. In some embodiments of the present invention, retrieve and rank component 208 is configured to search one or more databases 214 for test failure records that are relevant to user input 220 and to prioritize the relevant test failure records via an index score. In one or more embodiments of the present invention, the index scores are assigned to the relevant test records based at least in part on proximity of the relevant test failure records to the user input 220. In some embodiments of the present invention, retrieve and rank component 208 is configured to detect failure records that have an index score that is higher than a threshold index score, in which the index score is indicative of the similarity and/or proximity of the user input 220 for a particular test failure incident as compared to prior test failures. The proximity can be ascertained using a variety of suitable techniques, such as via clustering techniques, nearest-neighbors techniques, distance vector techniques, and other methods of similarity or dissimilarity measurement identification. In some embodiments of the present invention, the search of the databases 214 for relevant test failure records is further based at least in part on feedback data that is obtained by querying a feedback storage database (e.g. via query component 206).

Text data analysis component 210 is configured to analyze text data of records that are identified by retrieve and rank component 206 (e.g., records that have an index higher than a certain threshold value), to find relevant keywords and relevancy rates. The relevant words are those words that have been found in a particular prior test failure. For example, if a certain set of words is often associated with a certain type of test failure, then those words can be relevant to the test failure that is presently being detected by the user. The system associates the relevant keywords with a respective relevancy rate for the given failure occurrence. In some embodiments, the text data analysis component 210 utilizes a machine learning engine and/or API type service, such as for example Alchemy® API, to receive records from the retrieve and rank component 206 (e.g., via Retrieve and Rank™ service provided by IBM®) that have a retrieve and rank index score that is higher than a certain threshold value. Text data analysis component 210 then analyzes the test data of those received records to identify relevant keywords and their respective relevancy rates. For example, in some embodiments of the present invention, text data analysis component 210 is configured to analyze the unstructured text data of each of the detected failure records to identify relevant keywords and relevancy rates.

Text data analysis component 210 is further configured to generate a test solution priority list comprising one or more suggested test repair actions for the test failure, in which the list is generated based at least in part on the relevant keywords and the relevancy rates. In some embodiments of the present invention, text data analysis component 210 is configured to generate the test solution priority list by at least, for each given detected failure record that includes a relevant keyword that has a relevancy rate of the identified relevancy rates that is above a threshold relevancy rate, identifying a test repair action that is stored in the given detected failure record and then counting the frequency of the test repair action across the detected failure records.

In one or more embodiments, based on the proposed solution being a replacement part, tool advisor component 201 is configured to further query an inventory and production database (e.g., via query component 206) to gather data based on a set of attributes that pertain to the viability of a proposed replacement part solution. For example, in some embodiments of the present invention, a systems applications and products (SAP) database and/or a materials flow system (MFS) database is queried. In one or more embodiments of the present invention, the SAP and MFS databases are within tool advisor component 201 (e.g., database(s) 214). In some embodiments of the present invention, the set of attributes includes a part availability, a repair cycle time, a repair action difficulty level, a flag on quality hold/stop ship, a requested scheduled ship date (RSSD), and/or a planned scheduled ship date (PSSD).

As noted above, in one embodiment of the present invention, GUI interface component 204 is configured to output the test solution priority list to the user by at least displaying, by system 200 via the GUI, one or more suggested test repair actions in a window that is separate and/or distinct from the heat map. In one or more embodiments, outputting the test priority list via the GUI includes displaying, via the GUI, at least one of the respective confidence scores or respective repair cycle times for the one or more test repair actions. In some embodiments of the present invention, the respective confidence scores or respective repair cycle times are displayed within the window that is separate and/or distinct from the heat map. In some embodiments of the present invention, the GUI interface component 204 is configured to output to the user the test solution priority list, feedback inputs, as well as support information and documents.

In one or more embodiments, the tool advisor component is configured to execute one or more multi-criteria decision making (MCDM) algorithms (e.g., via MCDM algorithm component 212) to narrow down the one or more suggest test repair of the test solution priority list based at least in part on a plurality of attributes (e.g., via the querying of the inventory and production database in regards to the set of attributes identified above). For example, in some embodiments of the present invention, the MCDM algorithm component 212 is configured to obtain the proposed solution(s) of the priority list that are generated by a rank and retrieve type API, such as the Retrieve and Rank™ service provided by IBM® (e.g., rank and retrieve component 208), and then to revise the ranking of the proposed solutions in the priority list in view of the identified constraints. As is understood by persons having ordinary skill in the art, various suitable MCDM algorithms can be utilized to prioritize the proposed solutions based on the importance of the plurality of attributes so that a narrowed down priority list can be outputted via the GUI to a user. One example of a suitable type of MCDM algorithm can be found in Chanchal Saha et al., "A Decision Support System for Real-Time Order Management in a Heterogeneous Production Environment", Expert Systems with Applications, Oct. 30, 2015, Volume 50. In some embodiments of the present invention, MCDM algorithm component 212 is configured to incorporate manufacturing/ inventory constraints (e.g., parts and time availability, requested ship date, and skilled resources attributes), in addition to proposing a revised test solution list that is displayed along with an estimated repair cycle time.

In one or more embodiments, the priority list (e.g., priority list 424 (FIG. 4)) is outputted by tool advisor component 201 without first executing an MCDM algorithm. In some embodiments of the present invention, the MCDM algorithm is executed only during the occurrence of a set of constraints, such as when there are limited time and long queues for machine testing. In some embodiments of the present invention, the set of constraints includes at least one or more of a time limitation, a resource limitation, an inventory limitation, and/or a technical staff availability limitation.

Figure 3:
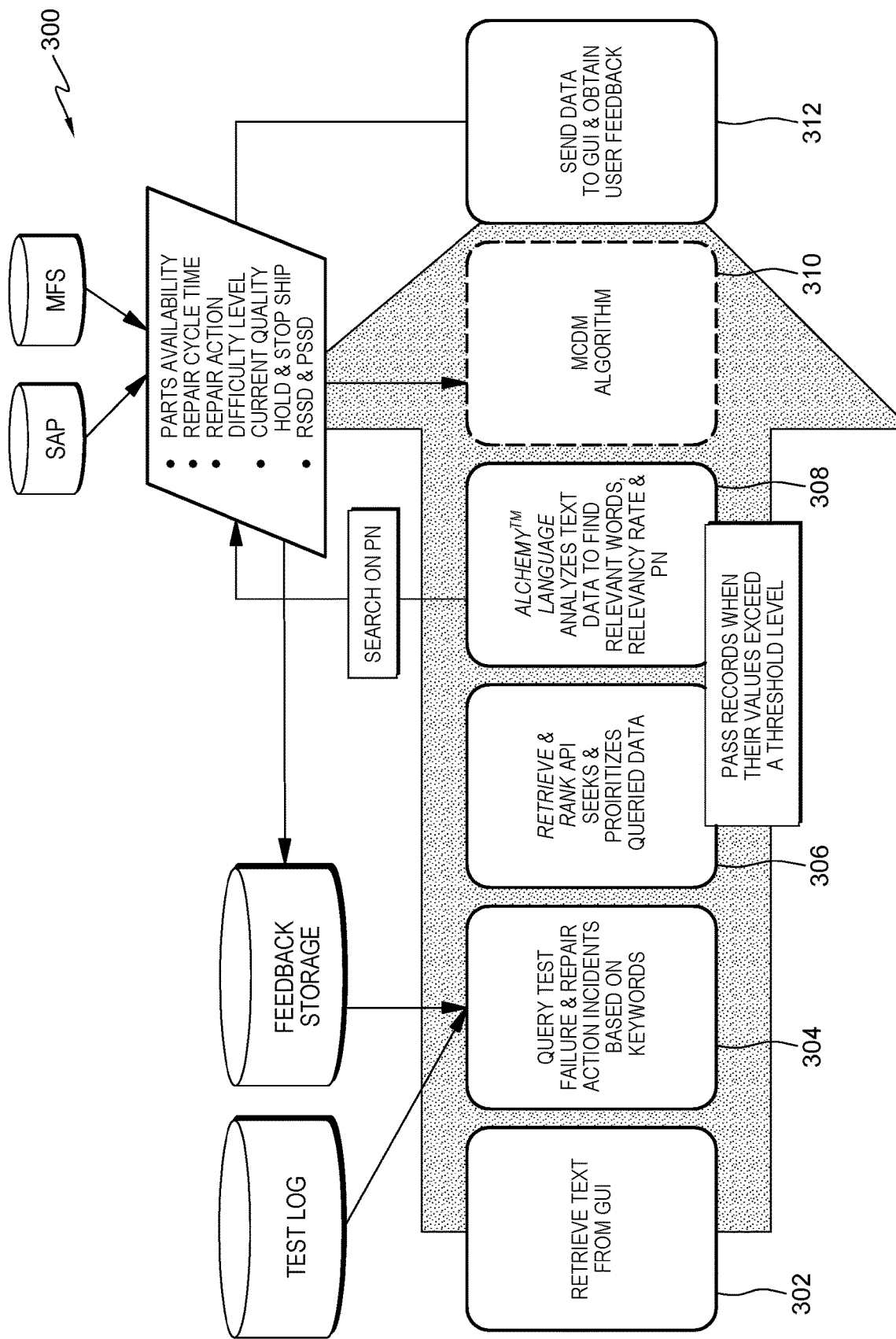
FIG. 3 depicts one embodiment of cognitive test advisor facility processing, in accordance with one or more aspects of the present invention.

FIG. 3 depicts one example of a process flow 300 that can be implemented by system 200 of FIG. 2 in accordance with one or more embodiments of the present invention. Process flow 300 illustrates a performance of steps in a manner similar to the functions identified above. As shown in FIG. 3, process flow 300 receives text input from a user at 302. At 304, test failure and repair action incidents are queried based on keywords identified in the user text input (e.g., unstructured data from the input). The querying in this example can include querying a defect database (i.e., test log database) and a feedback storage database. At 306, a Retrieve and Rank™ API service provided by IBM® is utilized to seek and prioritize the queried data. At 308, the Alchemy® API is utilized to analyze text data from records that have a retrieve and rank index score that is higher than a certain threshold value. A list of proposed solutions is identified from the analysis of the text data of the obtained records, in which the list of proposed solutions is identified by finding a set of relevant keywords, a relevancy rate, and a part number (PN) for each potential solution. The analysis includes searching a SAP database and a MFS database for a set of attributes that are associated with the part number. The set of attributes can include a part availability, a repair cycle time, a repair action difficulty level, a current quality hold & stop ship, and a RSSD & PSSD. At 310, an MCDM algorithm is executed to narrow down the list of proposed solutions based at least in part on the results of the search of the SAP and MFS database. At 312, the user is provided or sent the resulting priority list that includes the one or more proposed solutions, and the user provides feedback regarding the one or more proposed solutions, such as whether the solution was successful. The feedback is stored in the feedback storage database, which can be subsequently used via machine learning to improve the manner in which subsequent proposed solutions are identified by the system.

Figure 5:
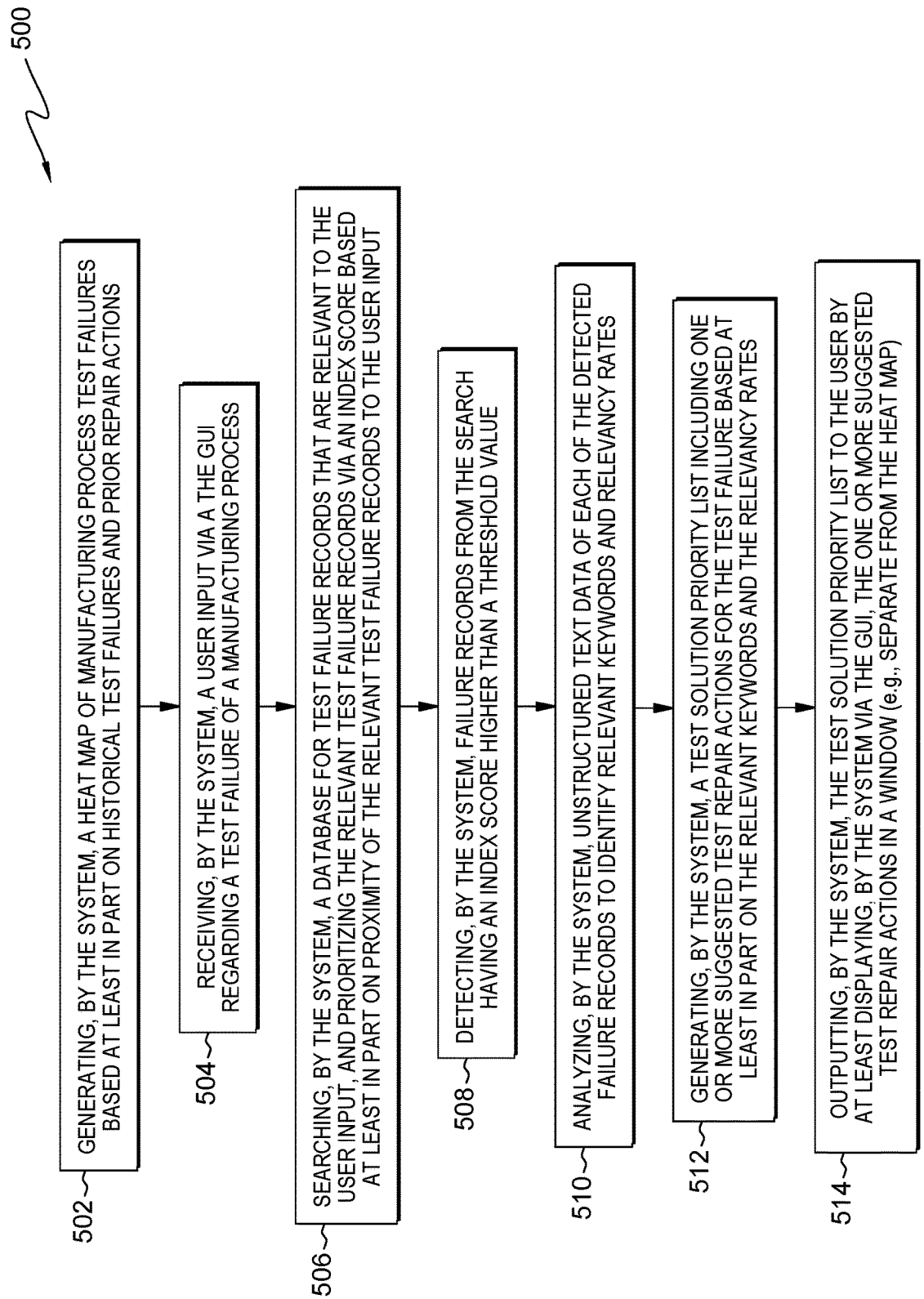
FIG. 5 depicts an operational embodiment of a cognitive test advisor facility/system, in accordance with one or more aspects of the present invention.

Additional details of the operation of system 200 (FIG. 2) are described below with reference to process flow 500 of FIG. 5. At 502, a heat map of manufacturing process test failures is generated based at least in part on historical test failures and prior repair actions, in which the heat map is presented to a user via a GUI. At 504, a user input is received via the GUI regarding a test failure of a manufacturing process, in which the user input can include structured and unstructured data. At 506, a database is searched for test failure records that are relevant to the user input. The relevant test failure records are then prioritized via an index score, in which the index score is assigned based at least in part on proximity of the relevant test failure records to the user input. At 508, failure records that have an index score that is higher than a threshold value are detected. At 510, unstructured text data of each of the detected failure records is searched to identify relevant keywords and relevancy rates. At 512, a test solution priority list is generated which includes one or more suggested test repair actions for the test failure based at least in part on the relevant keywords and the relevancy rates. At 514, the test solution priority list is outputted to the user by, for instance, displaying, by the system via a GUI, the one or more suggested test repair actions in a window, such as in a window separate from a heat map. In one or more embodiments, one or more suggested test repair actions are performed, such as, for instance, by the cognitive test advisor system itself (where applicable), or by a technician, and based on the repair action, feedback can be provided to improve subsequent proposed solutions identified by the system, as described herein.

In some embodiments of the present invention, structured and unstructured test result data and problem records can be used to establish relationships between test steps and root causes, in which the test steps indicate steps that are likely to fail given the presence of a root cause. In some embodiments of the present invention, the processes identified above (e.g., process flow 300 of FIG. 3 and methodology 500 of FIG. 5) can be used to identify symptoms of a test failure rather than a root cause. For example, in some embodiments of the present invention, a root cause can be a subsystem component failure whereas a symptom can be a subsystem failure. In some embodiments of the present invention, by avoiding tests which are related to a subsystem failure, more tests are screened out in comparison tests of a subsystem component failure. Accordingly, depending on the given test scenario, in some embodiments of the present invention, the system is configured to identify a root cause, a system failure screening, or both.

As noted, in one or more embodiments, the cognitive test advisor facility disclosed herein is configured to generate test plans, and/or suggested test repair actions, based on test value root causes and/or symptoms. In one or more embodiments, the facility analyzes structured and unstructured data using machine learning processes to determine one or more best possible test repair action recommendations, based on the user input. Further, in one or more embodiments, disclosed herein are solutions to several challenges when querying unstructured data for failure analysis and prioritizing recommendations for repair actions. In particular, one challenge addressed herein is that the unstructured data is queried from databases based on a user input. As an enhancement, the user input is expanded herein for non-exact-match words, spelling errors, non-technical word data (e.g., non-English data), part history, etc. Further, another challenge addressed herein is that graphical user interface of recommended repair actions for an incident might show multiple recommendations, even though the meaning of two or more different recommendations may be the same, for instance, due to machine learning processing not understanding the true meaning of particular recommendations. Another challenge for the cognitive test advisor facility is to determine relevant and meaningful weights for each queried data record with respect to the user input and/or provided feedback on success or failure of prior repair action recommendations. The challenges are addressed herein by creating, via data analytics, smart queries of manufacturing test data based on user inputs, proposing recommendations for repair actions that are meaningful and different from one another, and finding content for the tag clouds using multiple word and/or data dictionaries incorporated as part of, or available to, the test advisor facility or system.

Figure 6:
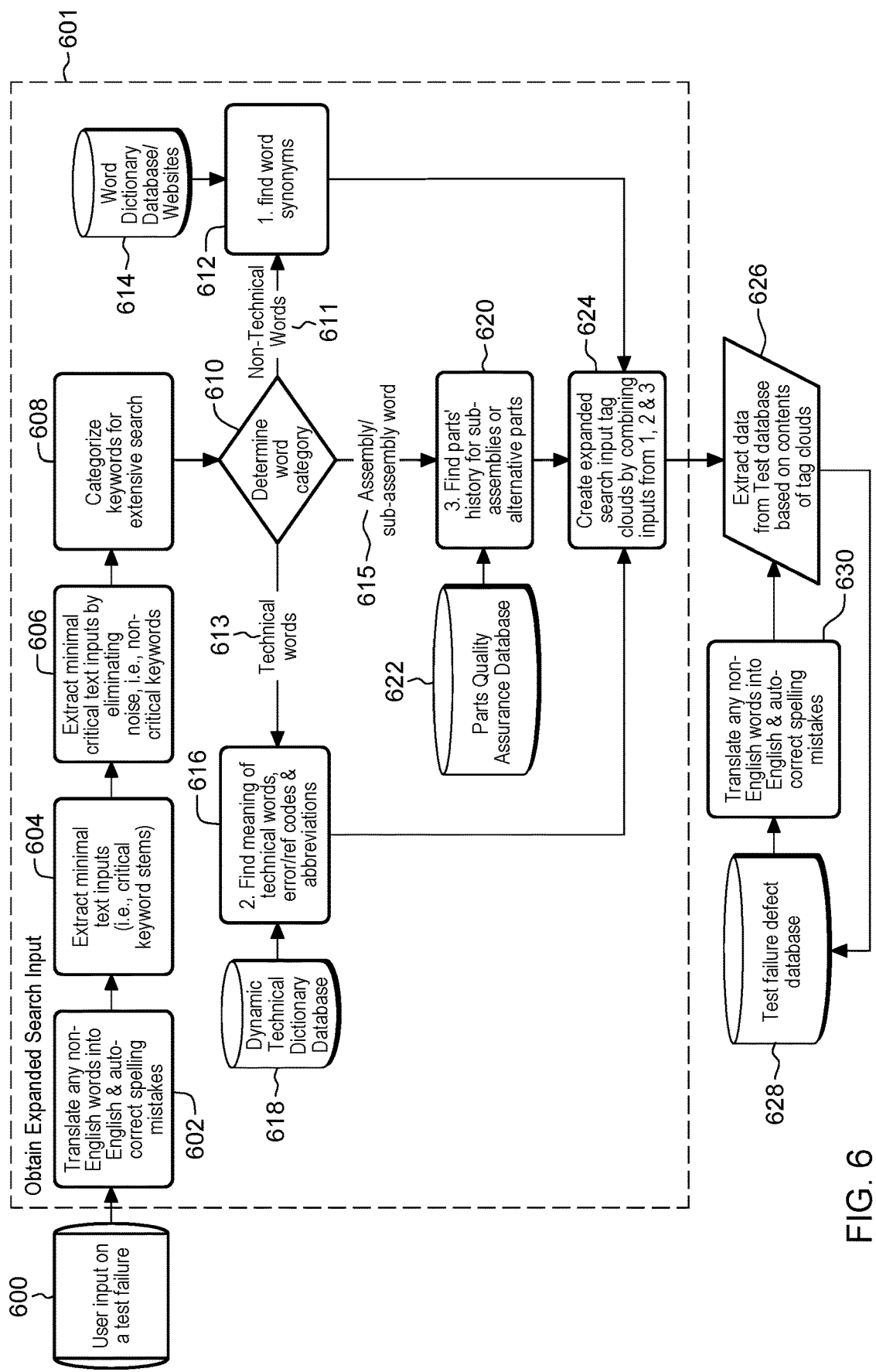
FIG. 6 depicts one embodiment of generating an expanded search input, and expanded searching, by cognitive test advisor facility processing, in accordance with one or more aspects of the present invention.

By way of example, FIG. 6 depicts one embodiment of test advisor facility processing that expands the search horizon for querying manufacturing test data based on a user input. As illustrated, one or more user inputs on a test failure are received 600 by the facility, which processes the user input data to obtain an expanded search input 601. The obtaining of the expanded search input can include, for instance, facility program code translating any non-English words into English and auto-correcting any spelling mistakes 602. (Note that processing of the user input using English language is provided herein by way of example only. The facility can be configured to process user input in any desired language.) Facility program code extracts the minimal text input by, for instance, obtaining critical keyword stems in the user input 604. Program code further extracts the minimal text input by eliminating noise; that is, eliminating any non-critical keywords 606. For instance, any words that will not add value to the search can be eliminated. The facility then categorizes the keywords for extensive searching 608. In one embodiment, the categorizing includes categorizing the words into, for instance, non-technical words, technical words, and assembly/sub-assembly words, such as part identifiers. In one or more embodiments, the facility determines for a particular keyword the applicable word category 610. Based on the word being a non-technical word, such as an English word, program code identifies any synonyms 612, such as available to the facility from electronic dictionaries, databases, and/or websites 614. Based on the word being a technical word 613, then program code identifies one or more alternate meanings of the technical word 616 using, for instance, a dynamic technical dictionary data structure/database 618, such as disclosed herein.

FIG. 7 depicts one embodiment of a dynamic technical dictionary data structure, as disclosed herein. In the embodiment of FIG. 7, the dynamic technical dictionary structure includes a technical words column, an alternative words column, and a relationship strength for each pairing. In the depicted example, the technical word node has multiple synonyms, such as cec, frame, drawer, book, and a relationship strength score is depicted for each pairing, to identify, for instance, which alternative is most closely related to the keyword at issue. In one embodiment, the relationship strength is determined by a combination strength score and a reinforcement learning score. By way of example, the combination strength score can be a score determined using an available natural language processing keyword search matching algorithm. The reinforcement learning score can be determined using a hierarchical reinforcement learning algorithm, such as described hereinbelow.

Continuing with FIG. 6, from inquiry 610, the program code can determine that the word is in the assembly/sub-assembly word category 615; that is, is a part identifier. In such a case, part history information (such as alternative part information) can be determined for the sub-assembly 620 with reference to one or more parts quality assurance databases 622. The facility can create expanded search input tag clouds by combining the expanded words obtained from finding word synonyms, finding meaning of technical words, and finding parts history 624. The expanded search input tag clouds are then used to extract data from one or more test failure defect logs or databases 628. In one or more embodiments, any non-English words retrieved from the database(s) are translated by the facility into English, and any spelling mistakes autocorrected 630 before, for instance, undergoing prioritization and evaluation for relevancy, as described above.

By way of further explanation, FIG. 8 depicts an example of the computer-implemented process of FIG. 6. In the embodiment of FIG. 8, a user input of "Eror BE306015 in modul P1 C13 re-code failure" is received. As illustrated, processing initially translates any non-English words into English, and autocorrects any spelling errors. By way of example, auto-correct program code and translator program code for pattern recognition processing can be incorporated as part of, or accessed by, the test advisor facility to accomplish these processes. The illustrated result is a conversion of the user input to "Error BE306015 in module P1 C13 re-code failure". As noted, in one or more embodiments, the test advisor facility includes program code for categorizing keywords for extensive searching. In one or more embodiments, the categories can include technical words, non-technical words (e.g., English words), as well assembly/sub-assembly words or part words. This categorizing is to facilitate finding the minimum critical input data from which to expand the query data. As noted with respect to FIG. 6, the non-technical words, technical words and part words are separately processed in one embodiment. For instance, in the example of FIG. 8, the technical words "BE306015", "re-code", and "module" are extracted, and program code locates synonyms or alternatives for each. In one or more embodiments, the meaning of each technical word is determined and expanded using a dynamical technical dictionary data structure with relationship strength scores, such as disclosed herein. FIG. 8 depicts sample tag cloud outputs based on the expanded technical words. Similarly, facility program code extracts the English words "error" and "failure" and determines synonyms or alternatives from, for instance, one or more available electronic dictionaries, word databases, websites, etc. As illustrated, each English error word is extracted from the user input, and the related synonyms or alternatives are output or provided as a respective expanded tag cloud (i.e., expanded search input tag cloud). Similarly, facility program code expands the assembly/sub-assembly or part-related words "P1 C13" to include "P1 C14, P1 C12". Program code determines the expanded terms by determining the parts history for a particular sub-assembly, or by determining alternative parts information, based on one or more parts history databases. In this manner, the additional content in the tag clouds (that is, the right-most column in FIG. 8) is obtained for use as an expanded search input to extract data from one or more databases using the additional contents of the tag clouds, as described above in connection with FIG. 6.

In one or more aspects, the above-noted, computer-implemented dynamic technical dictionary structure, or a separate computer-implemented, dynamic technical dictionary data structure, can also be used to derive recommendations for addressing a test failure that are unique, meaningful and potentially different from one another. In particular, in one or more embodiments, the dynamic technical dictionary structure is provided with error codes for the particular manufacturing process tests at issue. Depending on the product family, there may be tens of thousands of error codes for inclusion in the dynamic technical dictionary data structure. Additionally, the dynamic technical dictionary structure is provided with associated reference codes, such as reference code patterns captured in test error messages. In one or more embodiments, the reference codes are each tied or associated with one or more suggested repair actions in a data repository. Further, as noted above, a relationship strength score indicative of the relationship strength between a particular error code and reference code is provided. These relationships lead to the ability to generate multiple distinct recommendations that are unique. Using this dynamic technical dictionary data structure, the relationship strengths between an error code and a reference code can determine which possible repair action recommendations are to be provided back to the user by the test advisor facility. Note in this regard that a single error code can refer to multiple reference codes, and a single reference code can refer to multiple possible repair actions. Further, note that multiple error codes can refer to the same reference code, depending on the implementation and the repair action required.

Figure 9A:
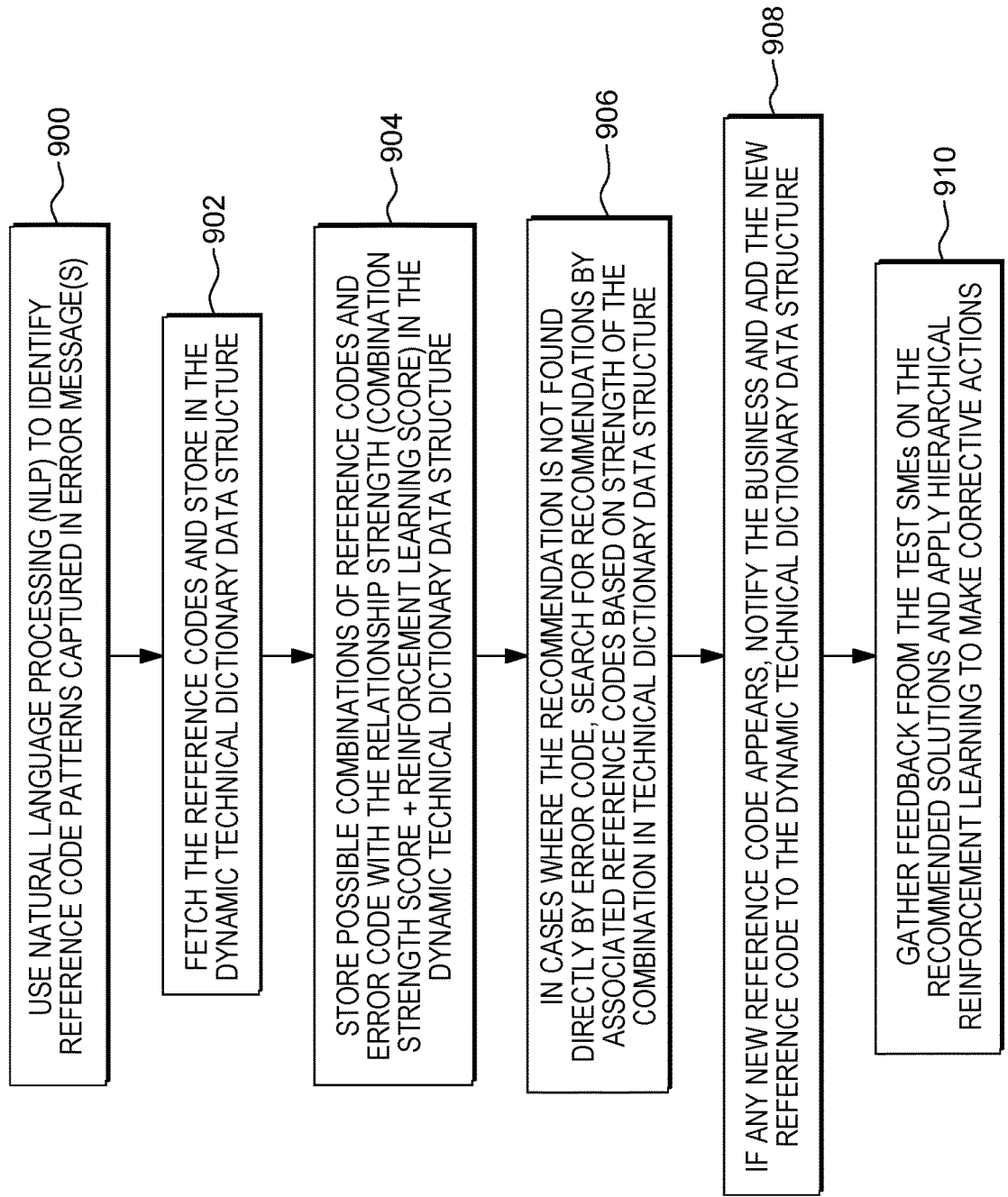
FIG. 9A depicts one embodiment of cognitive test advisor facility processing that updates a dynamic technical dictionary data structure with corrective actions using hierarchical reinforcement learning, in accordance with one or more aspects of the present invention.

FIG. 9A depicts one embodiment of this facility process to establish and use a dynamic technical dictionary or data structure as disclosed herein. As illustrated, in one or more embodiments, the cognitive test advisor facility utilizes natural language processing (NLP) to identify reference code patterns captured in a plurality of error messages, with error codes 900. For instance, a database of test failures can be accessed, with the error codes associated with each error message being extracted, and natural language processing of the test failure error messages being used to identify a reference code pattern for one or more messages. The error codes are saved to the dynamic technical dictionary structure, along with the associated reference codes found in the error messages for each error code 902. The possible combinations of reference codes and error codes are stored along with an associated relationship strength score (e.g., determined as disclosed herein) within the dynamic technical dictionary structure 904. As noted, the relationship strength score can be determined as a combination strength score and a reinforcement learning score, as the terms are defined herein. In cases where a recommendation is not found in a recommendations data structure directly by an error code, then recommendations can be identified through associated reference codes based on the relationship strength(s) of the combinations 906. Additionally, if any new reference code appears, the manufacturing business can be notified and the new reference code can be added to the dynamic technical dictionary data structure 908. In one or more implementations, feedback can be gathered from one or more subject matter experts (SMEs) on the results of recommended solutions, and the hierarchical reinforcement learning algorithm can be applied to take any corrective actions 910, as described herein.

FIG. 9B depicts one embodiment of the above-noted facility processing. In a first step, one or more databases of error codes and error code messages are accessed 920 to obtain a listing of error codes 922 for adding to the dynamic technical dictionary data structure. Additionally, in one or more embodiments, the cognitive test advisor facility uses natural language processing of the error messages to identify one or more reference codes for each error code. In addition, the facility determines for each pairing a relationship strength score, such as a combination strength score and a reinforcement learning score, as explained herein. The resultant dynamic technical dictionary data structure 924 is then used in determining or identifying meaningful and unique recommendations, which can include one or more potential repair actions, along with a historical success rate for each recommended repair action and present the information in a solution priority list 926. For instance, in one or more embodiments, the reference code from the dynamic technical dictionary data structure can be used to reference a repair action data structure from which the facility can generate the solution priority list. In one or more embodiments, one or more subject matter experts (SMEs) or domain experts in a particular manufacturing and/or testing area provide feedback on whether one or more repair action recommendations were successful or unsuccessful, which is then used by the facility in the reinforcement learning process to adjust relationship strength scores in the dynamic technical dictionary data structure, as described herein.

FIGS. 10A-10F depict further details of one embodiment for providing reinforcement learning incorporating subject matter expert feedback on recommended repair actions.

Figure 10A:
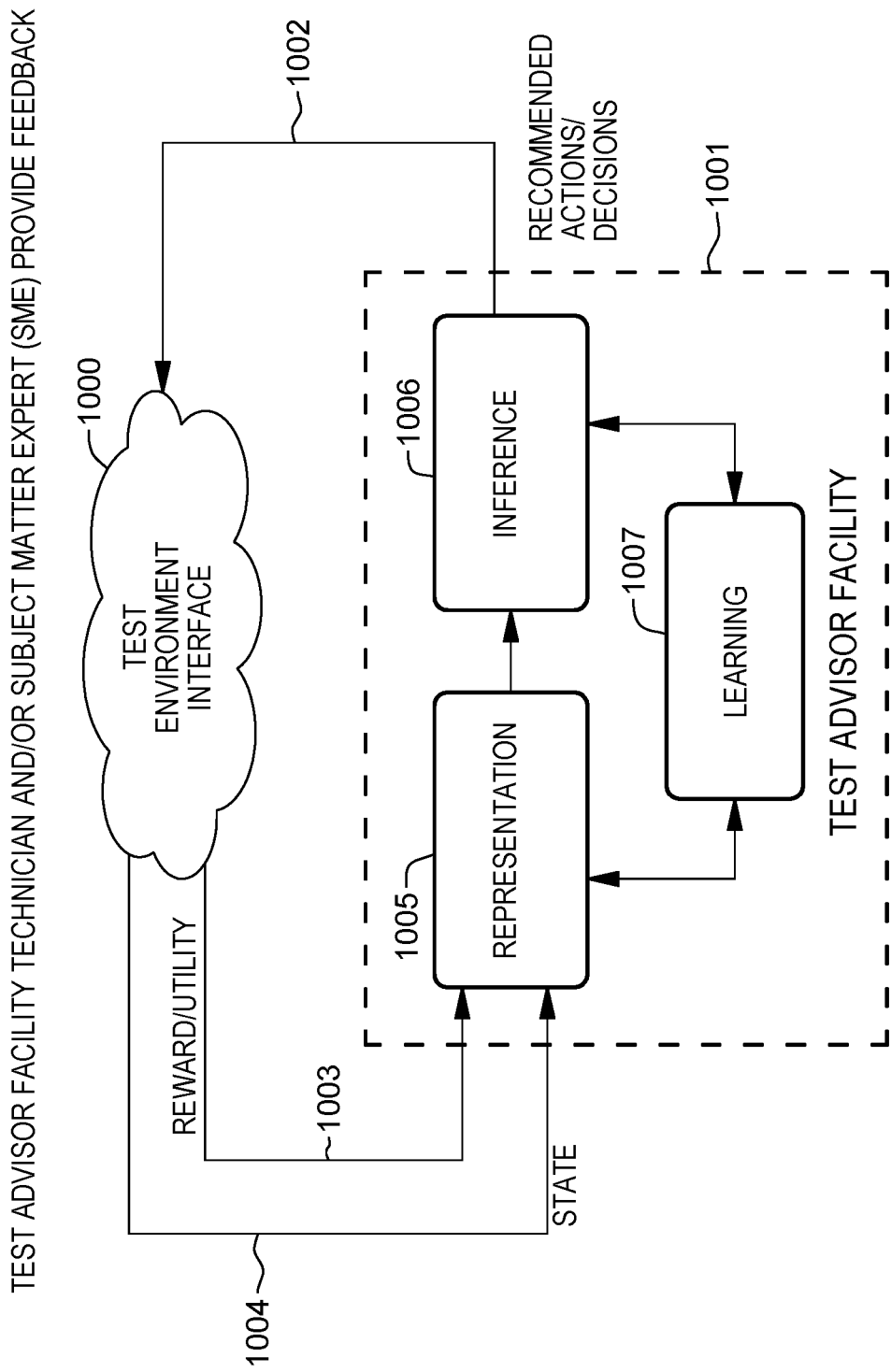
FIG. 10A depicts a high-level embodiment of cognitive test advisor facility processing, in accordance with one or more aspects of the present invention.

As illustrated in FIG. 10A, in one or more implementations, test advisor facility program code 1001 uses one or more dynamic technical dictionary data structures in providing repair recommendations as actions/decisions 1002. An action/decision is a particular repair action recommendation of all possible repair action recommendations. The actions/decisions 1002 are provided to the test environment 1000 which, in one or more embodiments, includes a test platform/subject matter expert/feedback interface. Test environment 1000 provides rules and/or decisions on whether to reward and/or penalize a particular recommended action. In one embodiment, a reward/utility 1003 is an indication of feedback from the test environment by which success or failure of the test advisor facility's recommendation is measured. A state 1004 indicates the situation where the test advisor facility finds itself, and policy is an action that the test advisor facility takes to change state. As described herein, in one or more implementations, test advisor facility program code 1001 incorporates cognitive machine learning to evaluate the representation 1005 of the manufacturing test process, determine one or more inferences 1006 therefrom, and to make adjustments 1007 to assess, resolve, and improve recommended repair actions based on the feedback provided. In one or more implementations, the test advisor facility can be configured with, or to utilize, machine learning APIs to make adjustments to the recommendations derived from the dynamic technical dictionary data structure using reinforcement learning. Advantageously, providing a feedback loop update mechanism using reinforcement learning such as described herein assists in quantifying the strength, by penalizing or rewarding a particular user's feedback (e.g., through recognizing a user's position or expertise), ensure a robust/meaningful feedback learning capability, and where desired, provide an emphasis on recent inputs, to influence a particular action/recommendation. For instance, the system can penalize down votes provided by the subject matter expert via the graphical user interface, and reward up votes for a particular recommendation.

In one or more embodiments, reinforcement learning can use a reinforcement learning score, or hierarchical reinforcement learning score, Z determined as:

$$Z_i = \sum_{t=1}^{\infty} \sum_{i=1,k=1}^{I,K} \gamma^t ((r_i(x(t), a(t)) \times w_{ik}))$$

where:
$Z_i$=hierarchical reinforcement learning score for $i^{th}$ action (i=1 . . . I);
γ=discount factor to accommodate future reward (0<γ≤1);
$r_i$=rewards/penalty for $i^{th}$ action;
$w_{ik}$=weight for $i^{th}$ recommendation for $k^{th}$ person (k= 1 . . . K);
x=state;
a=action/decision; and
t=time.

For example, for a test failure, the test advisor facility might provide a repair recommendation (i) as "retry 00V9307 DIMM CD/MM 32 GB MEM". The user's (k) feedback ($r_i$) for that repair recommendation at various times can be expressed as:
γ=discount factor to accommodate future reward (0<γ≤1);
$r_i$=rewards/penalty for $i^{th}$ action −1≤$r_i$≤1;
$w_{ik}$=weight for $i^{th}$ recommendation for $k^{th}$ person (k= 1 . . . K).

Figure 10B:
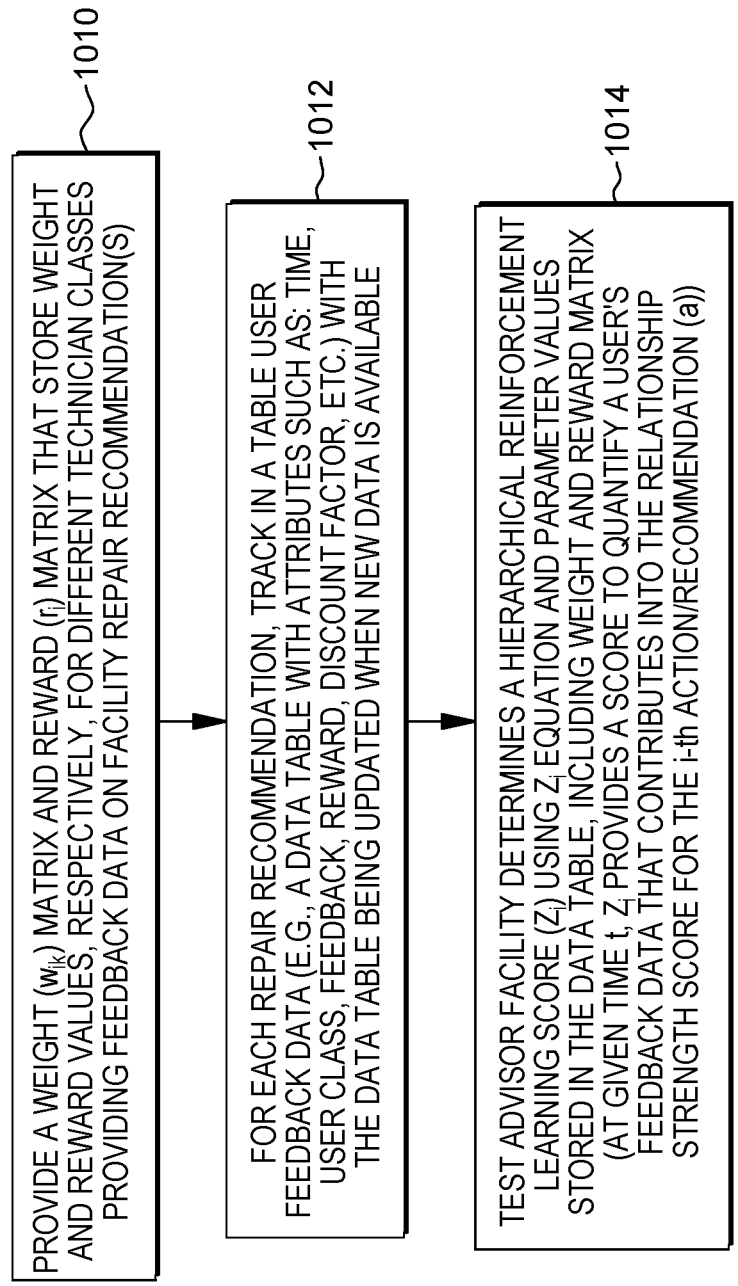
FIG. 10B depicts one embodiment of cognitive test advisor facility processing with hierarchical reinforcement learning, in accordance with one or more aspects of the present invention.

FIG. 10B depicts one embodiment of determining a hierarchical reinforcement learning score ($Z_i$), where a higher level of score $Z_i$ means a higher association of a repair action recommendation to a corrective action. A weight ($w_{ik}$) matrix and a reward ($r_i$) matrix are provided to store weight and reward values, respectively, for different technician classes providing feedback on repair recommendations 1010. By way of example, FIG. 10C depicts one example of feedback results obtained from different users (k), FIG. 10D depicts an example weight matrix, and FIG. 10E illustrates an example reward/penalty ($r_i$) matrix obtained from the feedback provided. As depicted in the weight matrix of FIG. 10D, feedback data from different subject matter expert positions (e.g., test lead, test engineer, test tech) can be weighted differently, and the reward/penalty matrix of FIG. 10E can be used to quantify the particular feedback provided by the subject matter expert.

As illustrated in FIG. 10B, for each repair recommendation, the test advisor facility program code can track in a table the user feedback (e.g., a data table with attributes such as: time, user class, feedback, reward, discount factor, etc.), with the data table being updated when new data is available 1012. An example data table is depicted in FIG. 10F, where feedback on a repair action recommendation is provided at different times by different users, with an associated reward/penalty ($r_i$) and weight ($w_{ik}$). The test advisor facility program code determines a hierarchical reinforcement learning score ($Z_i$) 1014 using, for instance, the above-noted equation and parameter values stored in the data table, including, in one or more embodiments, weight and reward matrix values. For instance at a given time (t), $Z_i$ provides a score to quantify a user's feedback that contributes into the relationship strength score for the $i^{th}$ action/recommendation (a), as discussed herein.

Further exemplary embodiments of a computing environment to implement one or more aspects of the present invention are described below with reference to FIGS. 11-13.

By way of further example, FIG. 11 depicts one embodiment of a computing environment 1100, which includes a computing system 1112. Examples of well-known computing systems, environments, and/or configurations that may be suitable for use with computer system 1112 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 1112 can be described in the general context of computer system-executable instructions, such as program modules, being executed by a computer system. Generally, program modules include routines, programs, objects, components, logic, data structures, and so on that perform particular tasks or implement particular abstract data types.

As depicted in FIG. 11, computing system 1112, is shown in the form of a general-purpose computing device. The components of computing system 1112 can include, but are not limited to, one or more processors or processing units 1116, a system memory 1123, and a bus 1118 that couples various system components including system memory 1123 to processor 1116.

In one embodiment, processor 1116 may be based on the z/Architecture® offered by International Business Machines Corporation, or other architectures offered by International Business Machines Corporation or other companies.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 1112 can include a variety of computer system readable media. Such media may be any available media that is accessible by computing system 1112, and it includes both volatile and non-volatile media, removable and non-removable media.

System memory 1123 can include computer system readable media in the form of volatile memory, such as random access memory (RAM) 1130 and/or cache memory 1132. Computing system 1112 can further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 1118 by one or more data media interfaces. As described below, memory 1123 can include at least one program product having a set (e.g., at least one) of program modules or code that are configured to carry out the functions of embodiments of the invention.

Program/utility 1140, having a set (at least one) of program modules 1142, can be stored in memory 1132 by way of example, and not limitation, as well as an operating system, one or more application programs, other program modules, and program data. Each of the operating system, one or more application programs, other program modules, and program data or some combination thereof, can include an implementation of a networking environment. Program modules 1142 generally carry out the functions and/or methodologies of embodiments of the invention as described herein. Alternatively, a facility, tool, module, logic, etc., 1101 can be provided within computing environment 1112 implementing cognitive test advisor facility processing, as disclosed herein.

Computing system 1112 can also communicate with one or more external devices 1114 such as a keyboard, a pointing device, a display 1124, etc.; one or more devices that enable a user to interact with computing system 1112; and/or any devices (e.g., network card, modem, etc.) that enable computing system 1112 to communicate with one or more other computing devices. Such communication can occur via Input/Output (I/O) interfaces 1122. Still yet, computing system 1112 can communicate with one or more networks such as a local area network (LAN), a general wide area network (WAN), and/or a public network (e.g., the Internet) via network adapter 1120. As depicted, network adapter 1120 communicates with the other components of computing system, 1112, via bus 1118. It should be understood that although not shown, other hardware and/or software components could be used in conjunction with computing system 1112. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server, such as the one depicted in FIG. 11. Computer system/server 1112 of FIG. 11 can be practiced in distributed cloud computing environments where tasks are performed by remote processing devices that are linked through a communications network. In a distributed cloud computing environment, program modules may be located in both local and remote computer system storage media including memory storage devices. Computer system/server 1112 is capable of being implemented and/or performing any of the functionality set forth hereinabove.

Figure 12:
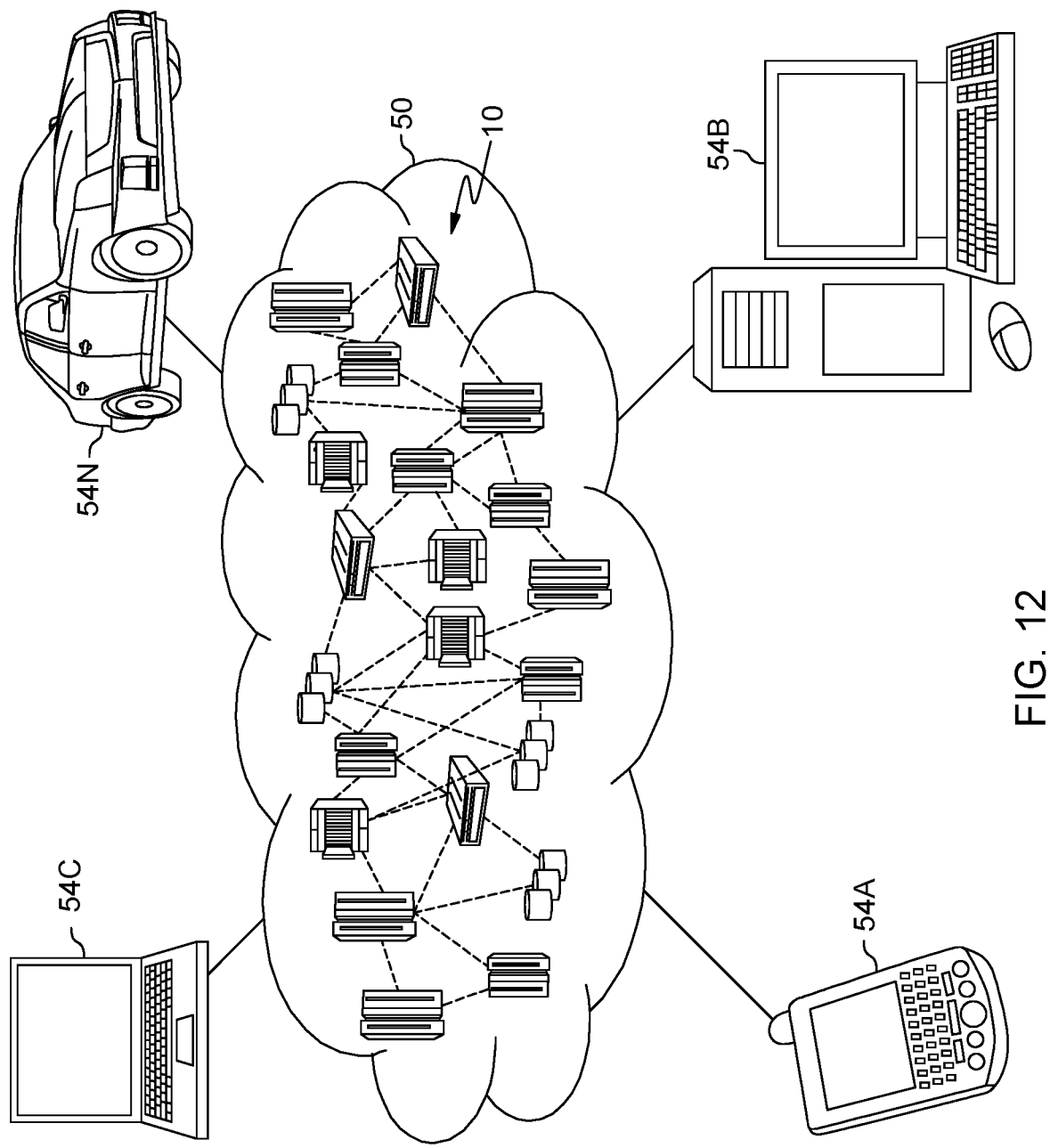
FIG. 12 depicts one embodiment of a cloud computing environment which can facilitate implementing, or be used in association with, one or more aspects of the present invention.

Referring now to FIG. 12, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 13:
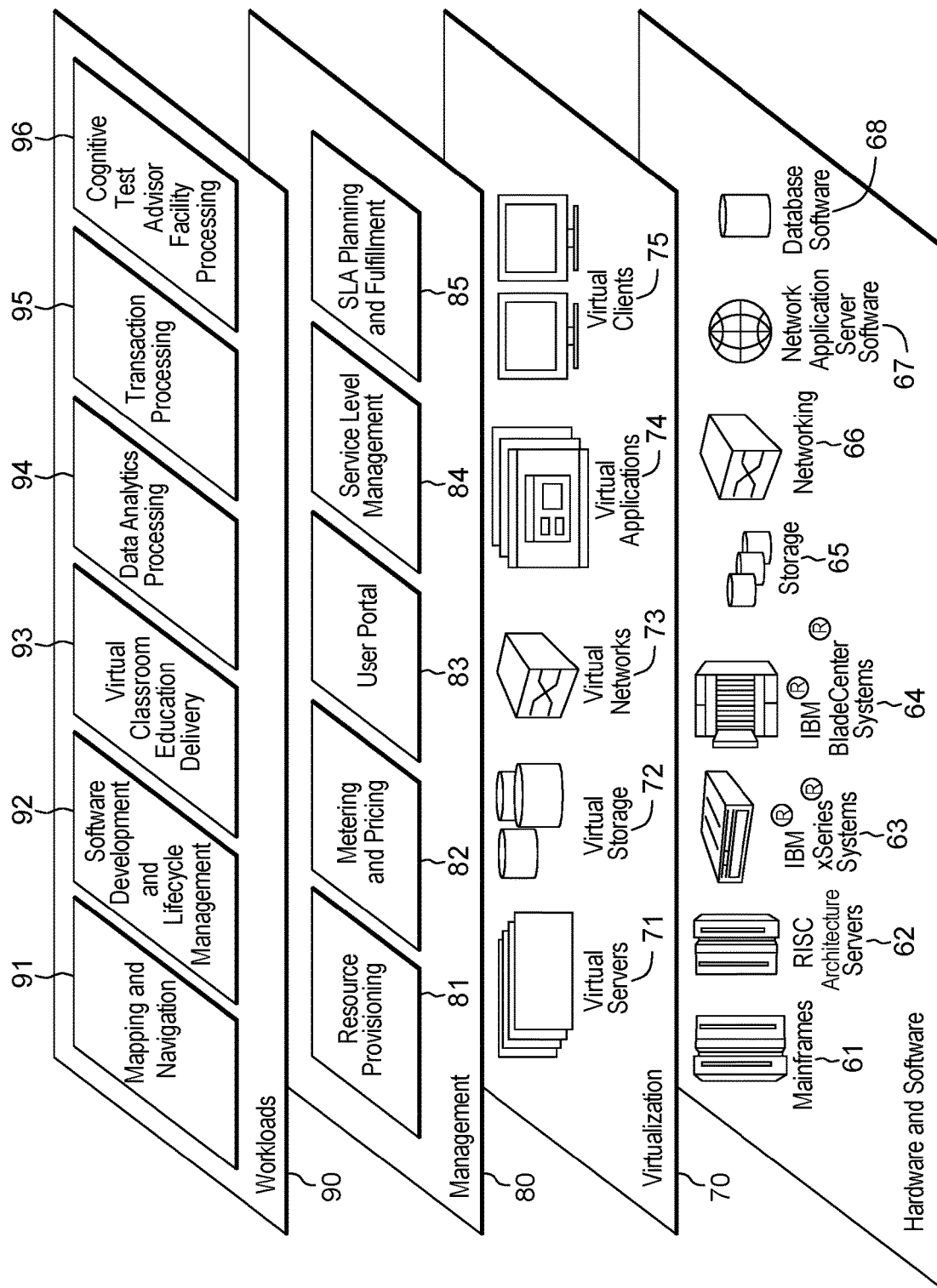
FIG. 13 depicts an example of abstraction model layers, which can facilitate implementing cognitive test advisor facility processing, in accordance with one or more aspects of the present invention.

Referring to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive test advisor facility processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method comprising:
   receiving, by a system comprising one or more processors, a user input regarding a test failure occurring during manufacturing testing;
   generating, by the system, from the user input an expanded search input, the generating including identifying additional, alternative words for one or more words in the user input to obtain an expanded number of keywords for searching;
   searching, by the system, at least one database for test failure records relevant to the keywords of the expanded search input and prioritizing relevant test failure records via a relationship strength score based, at least in part, on relationship of the test failure records to one or more keywords of the expanded search input, wherein the prioritizing includes referencing a dynamic technical dictionary database including error code and reference code associations with relationship strength values in determining relationship of test failure records to one or more keywords of the expanded search input;
   detecting, by the system, test failure records from the searching having a relationship strength score higher than a threshold value;
   analyzing, by the system, the detected test failure records to identify potential test repair actions;
   generating, by the system, based on the analyzing, a solution priority list comprising one or more suggested test repair actions for the test failure; and
   providing, by the system, the solution priority list to the user.

2. The computer-implemented method of claim 1, wherein the generating of the expanded search input further comprises:
   categorizing keywords of the user input into multiple categories, the multiple categories including a technical words category; and
   producing expanded search input tag clouds for use by the searching, the producing including separately identifying additional, alternative words for one or more technical words of the user input.

3. The computer-implemented method of claim 2, wherein the multiple categories further include a non-technical words category and a parts identifier category.

4. The computer-implemented method of claim 3, wherein producing the expanded search input tag clouds includes:
   identifying one or more synonyms for one or more words of the user input in the non-technical word category;

ascertaining meaning of one or more words of the user input in the technical words category, the ascertaining being with reference to the dynamic technical dictionary database;

identifying related part history information for one or more system part words of the user input in the parts identifier category; and wherein producing the expanded search input tag clouds is with reference to the identifying one or more synonyms for one or more words of the user input in the non-technical words category, the ascertaining meaning of one or more words of the user input in the technical words category, and the identifying of related part history information for one or more system part words of the user input in the parts identifier category.

5. The computer-implemented method of claim 4, wherein the searching, by the system, of the at least one database for the test failure records, comprises searching the at least one database using the expanded search input tag clouds to identify test failure records relevant thereto.

6. The computer-implemented method of claim 1, further comprising providing the relationship strength values for the dynamic technical dictionary database using machine learning, the providing using a reinforcement learning score in determining one or more relationship strength values for the dynamic technical dictionary database.

7. The computer-implemented method of claim 6, wherein the reinforcement learning score for a potential test repair action is related, in part, to expertise of a person providing feedback on the potential test action repair.

8. The computer-implemented method of claim 6, wherein the reinforcement learning score for a potential test repair action is related, in part, to a time-weighting emphasizing more recent feedback on the potential test action repair.

9. The computer-implemented method of claim 6, wherein the reinforcement learning score ($Z_i$) is determined using:

$$Z_i = \sum_{t=1}^{\infty} \sum_{i=1,k=1}^{I,K} \gamma^t((r_i(x(t), a(t)) \times w_{ik}))$$

where:
$Z_i$=hierarchical reinforcement learning score for $i^{th}$ action (i=1 . . . I);
$\gamma$=discount factor to accommodate future reward (0<$\gamma$≤1);
$r_i$=rewards/penalty for $i^{th}$ action;
$W_{ik}$=weight for $i^{th}$ recommendation for $k^{th}$ person (k= 1 . . . K);
x=state;
a=action/decision; and
t=time.

10. A computer system comprising:
a memory; and
a processor in communication with the memory, wherein the computer system is configured to perform a method comprising:
receiving, by a system comprising one or more processors, a user input regarding a test failure occurring during manufacturing testing;
generating, by the system, from the user input an expanded search input, the generating including identifying additional, alternative words for one or more words in the user input to obtain an expanded number of keywords for searching;
searching, by the system, at least one database for test failure records relevant to the keywords of the expanded search input and prioritizing relevant test failure records via a relationship strength score based, at least in part, on relationship of the test failure records to one or more keywords of the expanded search input, wherein the prioritizing includes referencing a dynamic technical dictionary database including error code and reference code associations with relationship strength values in determining relationship of test failure records to one or more keywords of the expanded search input;
detecting, by the system, test failure records from the searching having a relationship strength score higher than a threshold value;
analyzing, by the system, the detected test failure records to identify potential test repair actions;
generating, by the system, based on the analyzing, a solution priority list comprising one or more suggested test repair actions for the test failure; and
providing, by the system, the solution priority list to the user.

11. The computer system of claim 10, wherein the generating of the expanded search input further comprises:
categorizing keywords of the user input into multiple categories, the multiple categories including a technical words category; and
producing expanded search input tag clouds for use by the searching, the producing including separately identifying additional, alternative words for one or more technical words of the user input.

12. The computer system of claim 11, wherein the multiple categories further include a non-technical words category and a parts identifier category, and wherein producing the expanded search input tag clouds includes:
identifying one or more synonyms for one or more words of the user input in the non-technical word category;
ascertaining meaning of one or more words of the user input in the technical words category, the ascertaining being with reference to the dynamic technical dictionary database;
identifying related part history information for one or more system part words of the user input in the parts identifier category; and
wherein producing the expanded search input tag clouds is with reference to the identifying one or more synonyms for one or more words of the user input in the non-technical words category, the ascertaining meaning of one or more words of the user input in the technical words category, and the identifying of related part history information for one or more system part words of the user input in the parts identifier category.

13. The computer system of claim 10, further comprising providing the relationship strength values for the dynamic technical dictionary database using machine learning, the providing using a reinforcement learning score in determining one or more relationship strength values for the dynamic technical dictionary database.

14. The computer system of claim 13, wherein the reinforcement learning score for a potential test repair action is related, in part, to expertise of a person providing feedback on the potential test action repair.

15. A computer program product comprising:
at least one computer-readable storage medium readable by a system comprising at least one processing circuit and storing instructions for execution by the at least one processing circuit for performing a method comprising:

receiving, by the system, a user input regarding a test failure occurring during manufacturing testing;

generating, by the system, from the user input an expanded search input, the generating including identifying additional, alternative words for one or more words in the user input to obtain an expanded number of keywords for searching;

searching, by the system, at least one database for test failure records relevant to the keywords of the expanded search input and prioritizing relevant test failure records via a relationship strength score based, at least in part, on relationship of the test failure records to one or more keywords of the expanded search input, wherein the prioritizing includes referencing a dynamic technical dictionary database including error code and reference code associations with relationship strength values in determining relationship of test failure records to one or more keywords of the expanded search input;

detecting, by the system, test failure records from the searching having a relationship strength score higher than a threshold value;

analyzing, by the system, the detected test failure records to identify potential test repair actions;

generating, by the system, based on the analyzing, a solution priority list comprising one or more suggested test repair actions for the test failure; and providing, by the system, the solution priority list to the user.

16. The computer program product of claim 15, further comprising providing the relationship strength values for the dynamic technical dictionary database using machine learning, the providing using a reinforcement learning score in determining one or more relationship strength values for the dynamic technical dictionary database.

17. The computer program product of claim 16, wherein the reinforcement learning score for a potential test repair action is related, in part, to expertise of a person providing feedback on the potential test action repair.

* * * * *